United States Patent [19]

Wakabayashi et al.

[11] Patent Number: 5,553,202
[45] Date of Patent: Sep. 3, 1996

[54] ACCESSORY CONTROL DEVICE WHICH TRANSFERS DATA FROM ELECTRONIC DEVICE USING PART OF ADDRESS SIGNAL AND LATCH

[75] Inventors: Kenichi Wakabayashi; Chitoshi Takayama; Tadashi Shiozaki, all of Suwa, Japan

[73] Assignee: Seiko Epson Corporation, Tokyo, Japan

[21] Appl. No.: 910,590

[22] Filed: Jul. 8, 1992

[30] Foreign Application Priority Data

Mar. 19, 1992 [JP] Japan ............... PCT/JP92/00330

[51] Int. Cl.⁶ ..................................... G06F 15/00
[52] U.S. Cl. ............................. 395/115; 395/114
[58] Field of Search .................... 395/115, 110, 395/116, 119, 162; 358/296; 900/70

[56] References Cited

U.S. PATENT DOCUMENTS

| | | | |
|---|---|---|---|
| 4,459,050 | 7/1984 | Goldberg et al. | 400/121 |
| 4,559,620 | 12/1985 | Blair | 364/200 |
| 5,068,807 | 11/1991 | Ikenoue | 395/115 |
| 5,108,207 | 4/1992 | Isobe et al. | 400/70 |
| 5,138,696 | 8/1992 | Nagata | 395/110 |
| 5,142,614 | 8/1992 | Schreider et al. | 395/115 |
| 5,146,545 | 9/1992 | Maruyama | 395/115 |
| 5,276,799 | 1/1994 | Rivshin | 395/114 |
| 5,276,802 | 1/1994 | Yamaguchi et al. | 395/110 |
| 5,307,458 | 4/1994 | Freiburg et al. | 395/162 |
| 5,345,314 | 9/1994 | Ho-Il | 358/296 |

*Primary Examiner*—Raymond J. Bayerl
*Assistant Examiner*—Steven P. Sax
*Attorney, Agent, or Firm*—W. Glen Johnson

[57] ABSTRACT

An accessory control device, also called a cartridge, is coupled to an electronic device, such as a printer, and a large amount of data is transferred from the electronic device to the accessory control device. An electronic control device within the electronic device reflects the data it is transferring to cartridge 3 installed in a slot of a printer in the lower 8 bits of the address signal line (CAB) and outputs the data. Data corresponding to this address are read from ROM 671 according to this address specification and held in latch 657. The cartridge is internally equipped with a FIFO memory 621, and when register FIFOREQ of the FIFO write registers is accessed, the data being held in latch 657 is written to FIFO memory 621 and the address counter for writing is incremented. The transfer of multiple bytes of data from the electronic device is completed by repeating this process. By means of a configuration that utilizes signal/FIFOWR, which is output by accessing register FIFOWR that specifies the setting of data in latch 657 as the signal/FIFOREQ, data can be transferred in a single access.

22 Claims, 22 Drawing Sheets

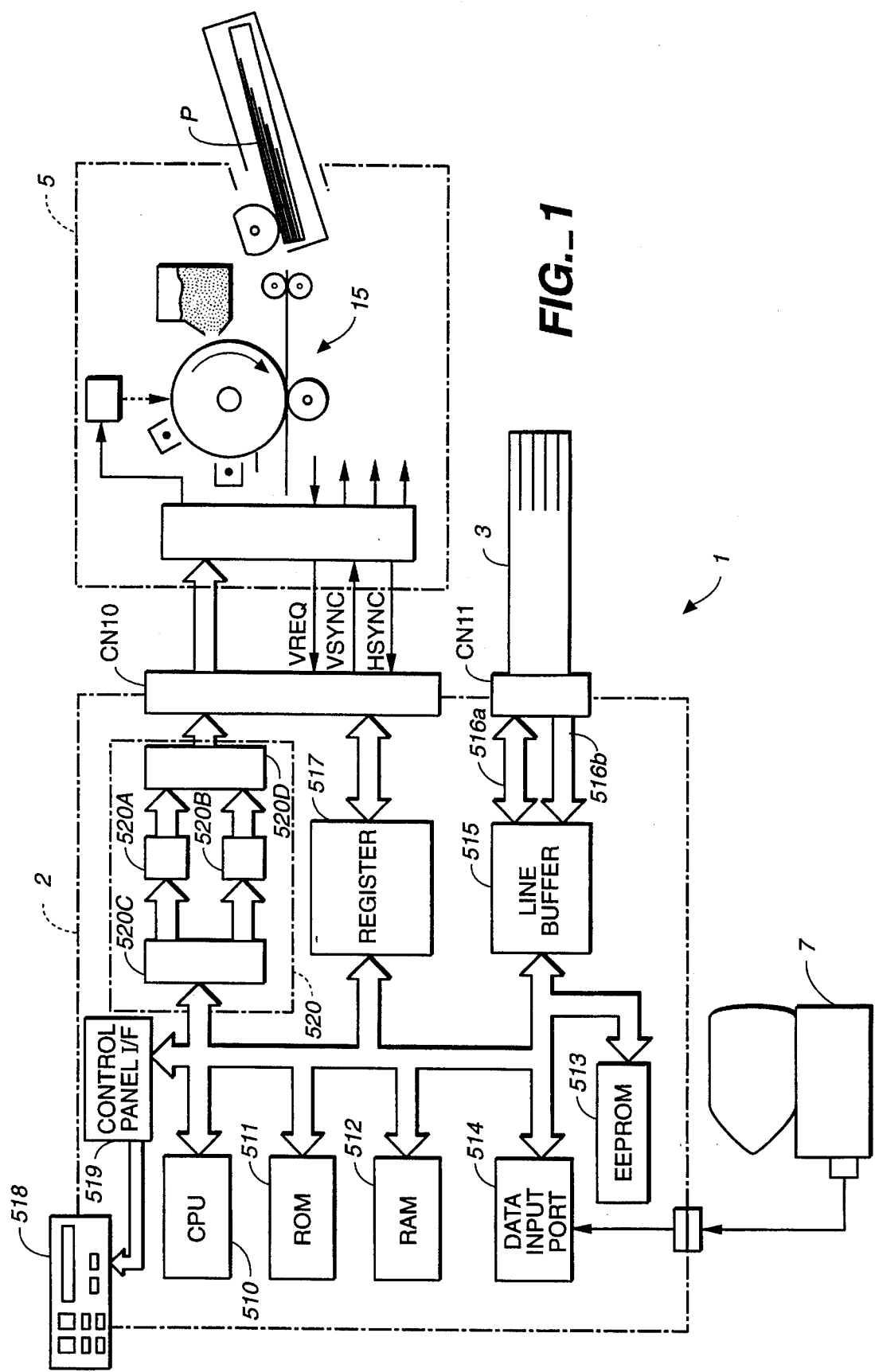
FIG._1

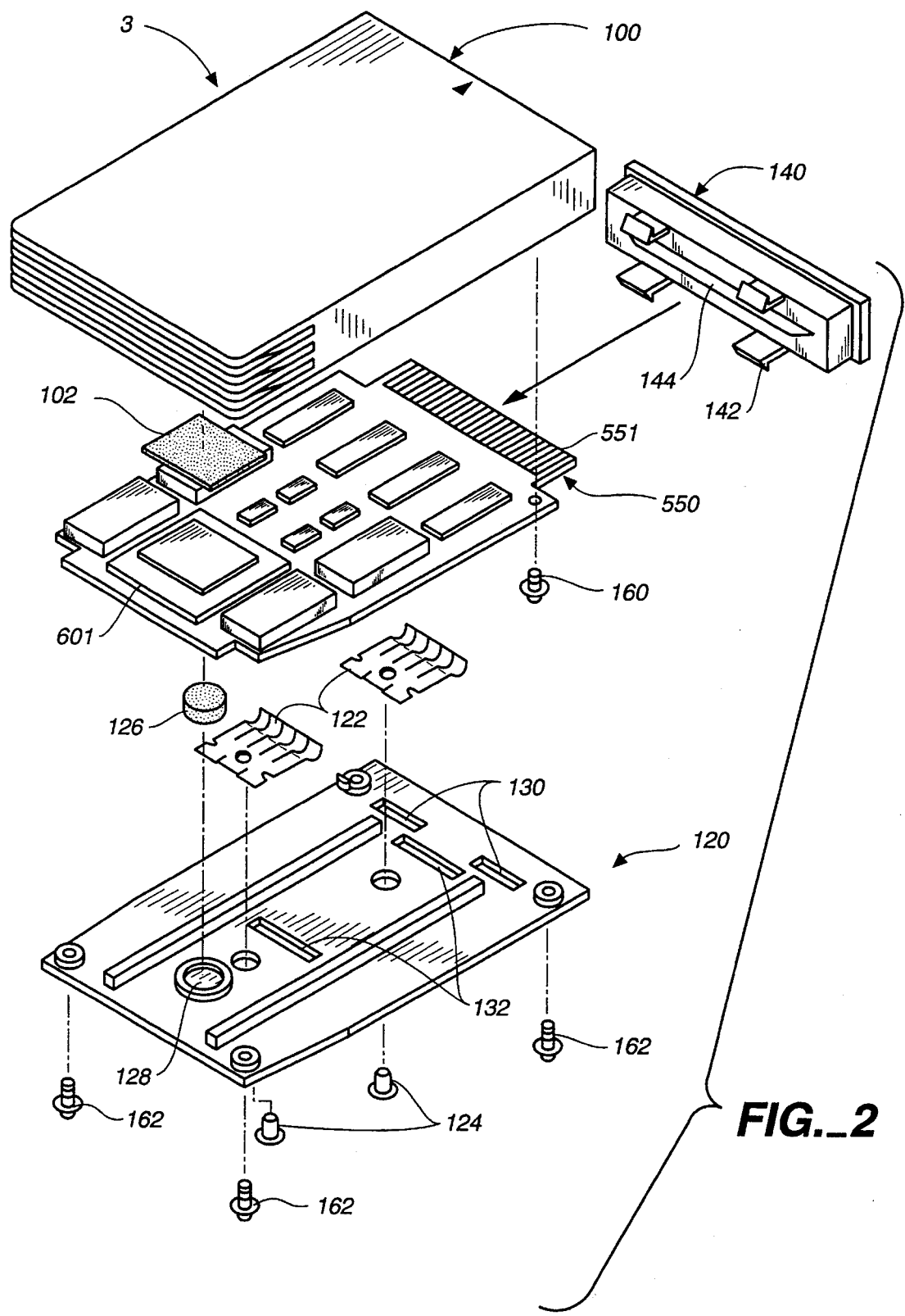
FIG._2

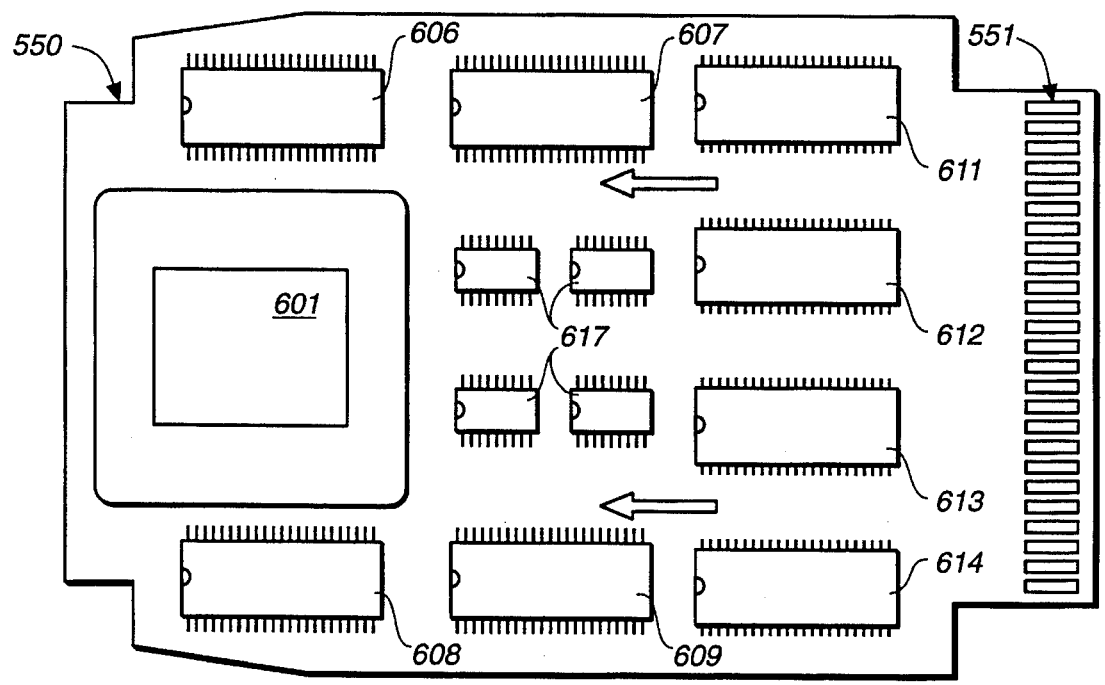
FIG._3A
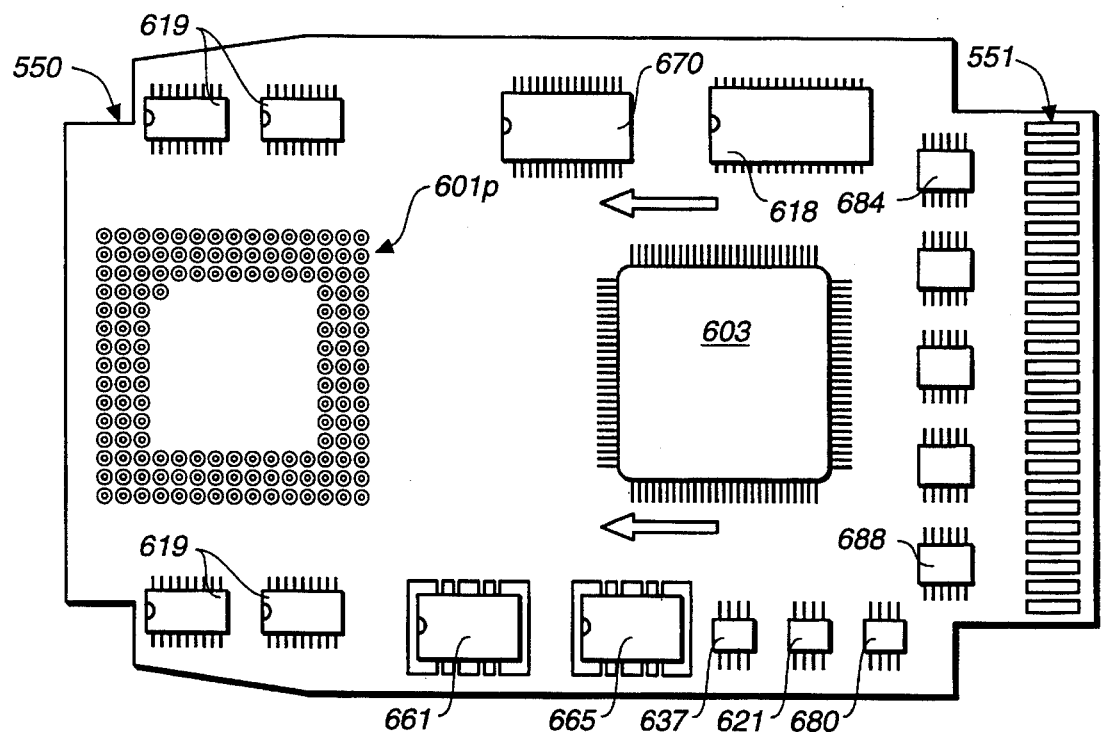
FIG._3B

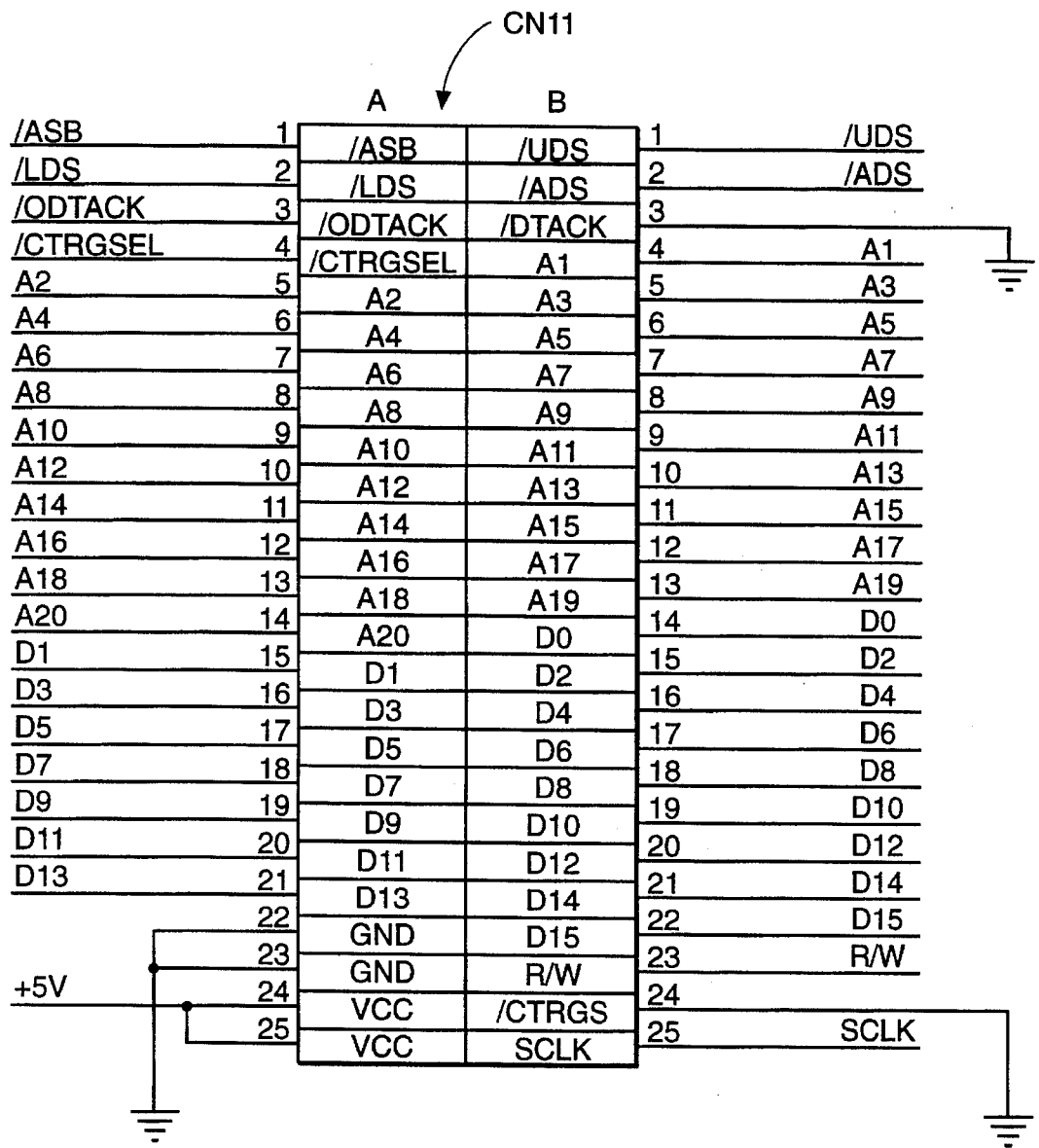
FIG._4
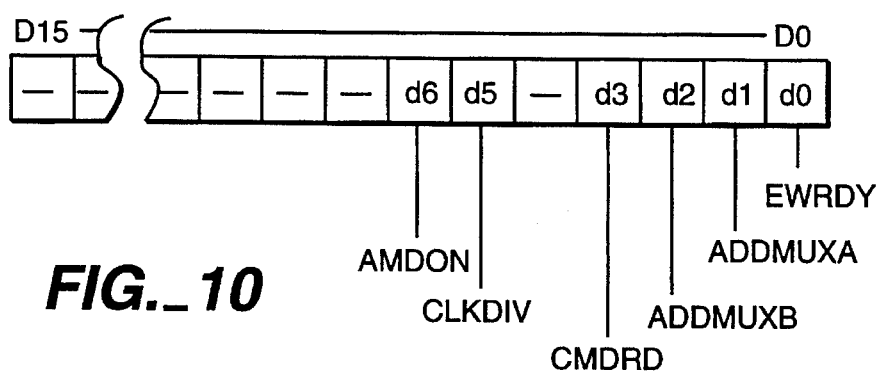
FIG._10

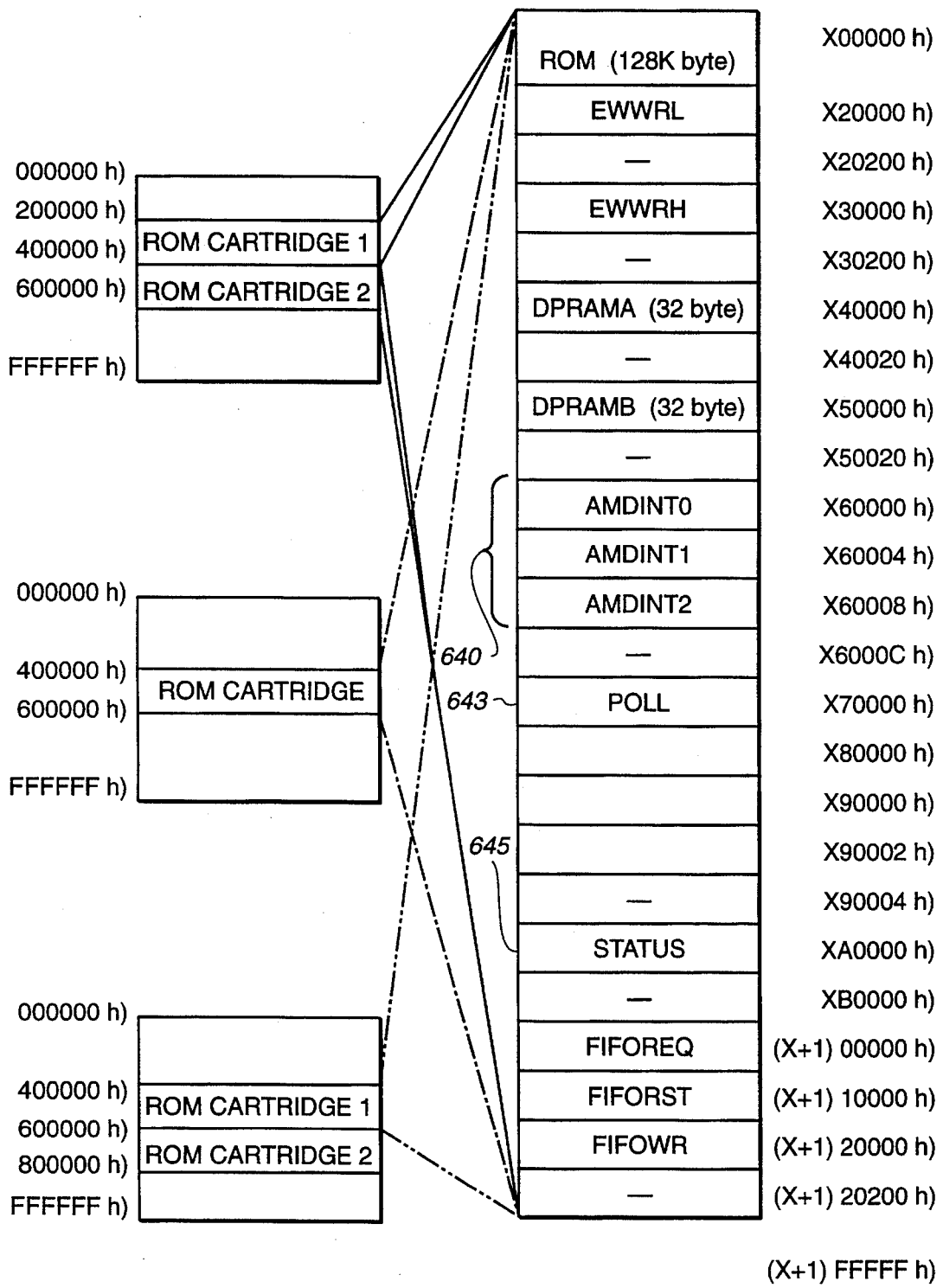
FIG._5

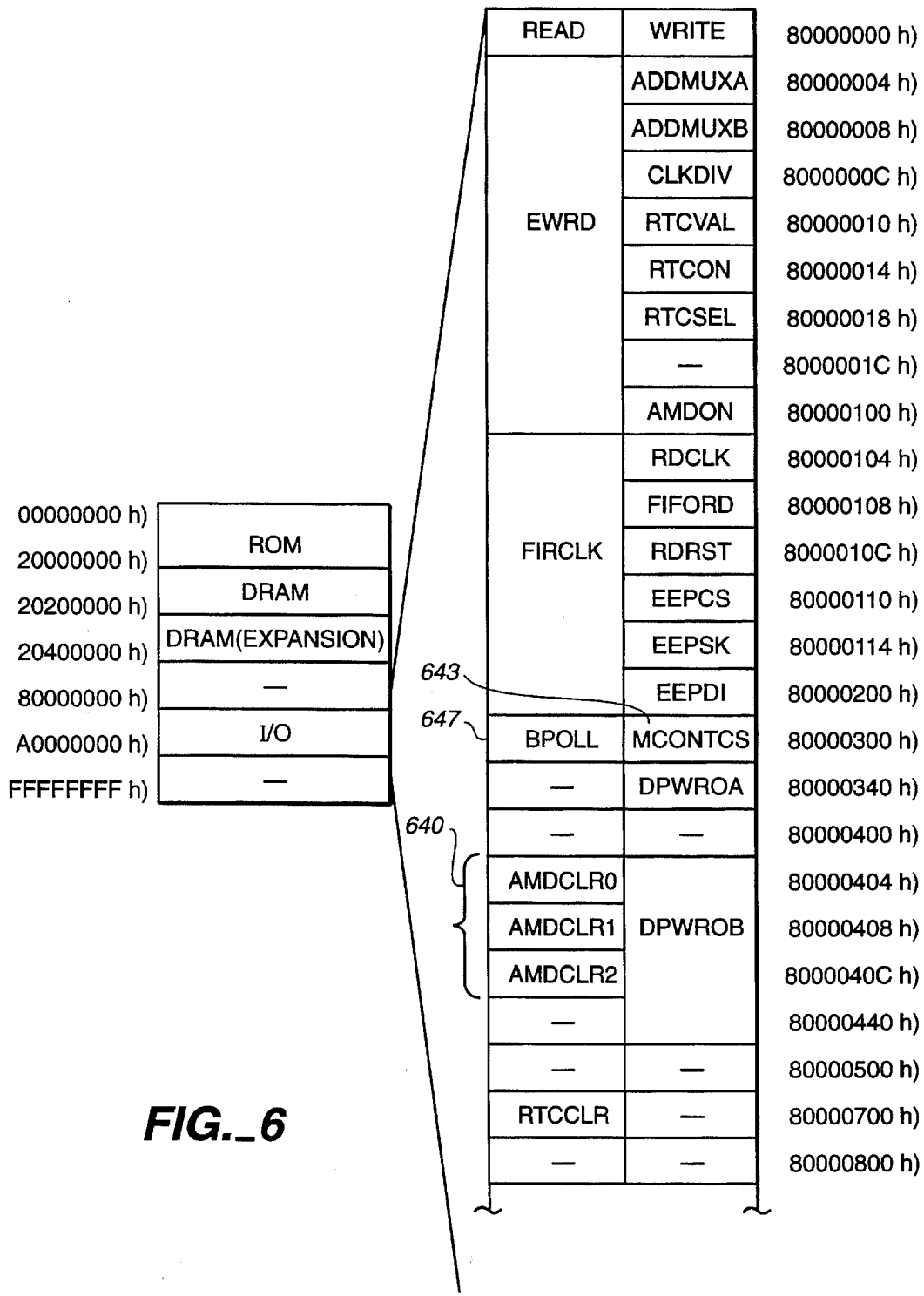
FIG._6

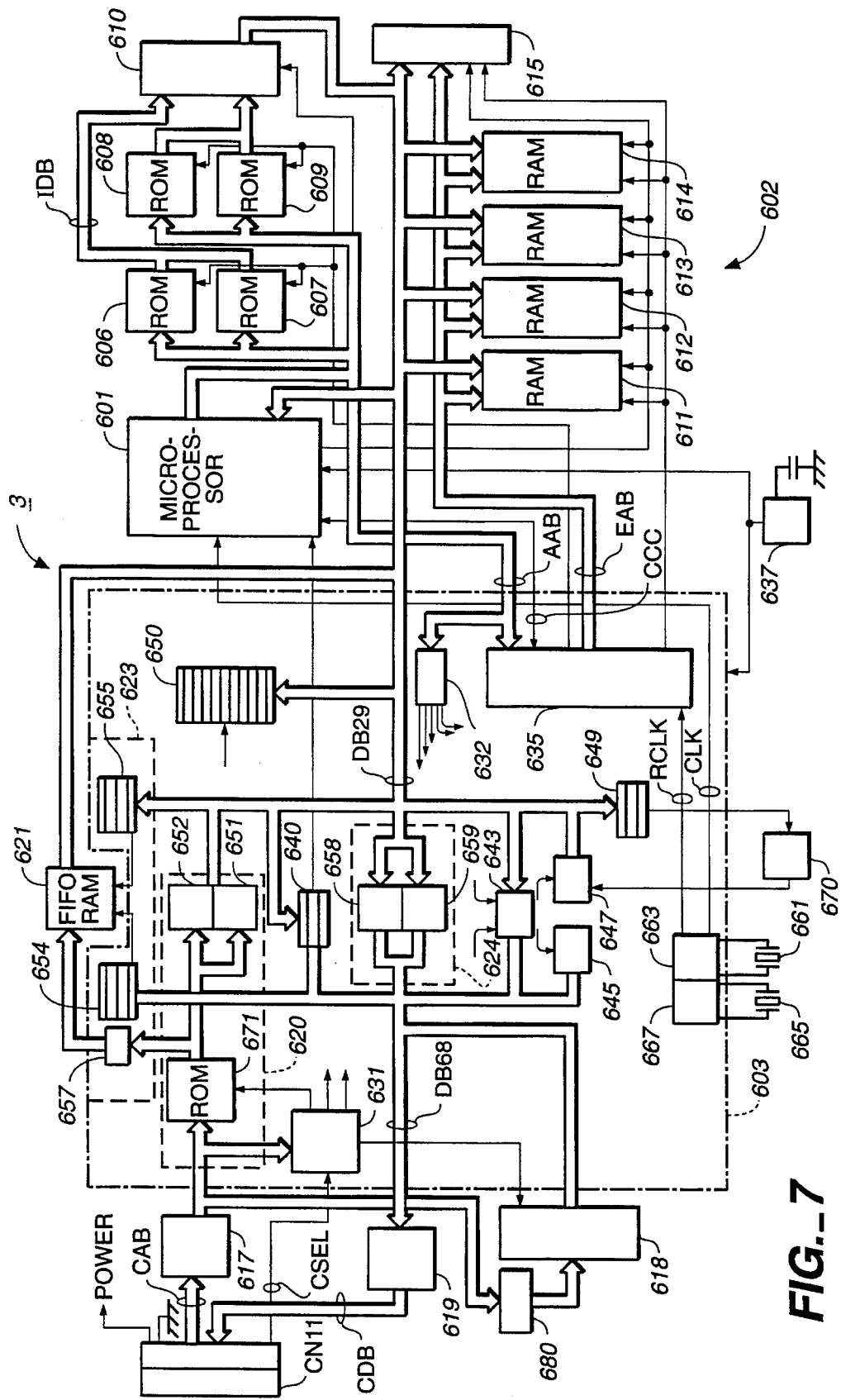
FIG._7

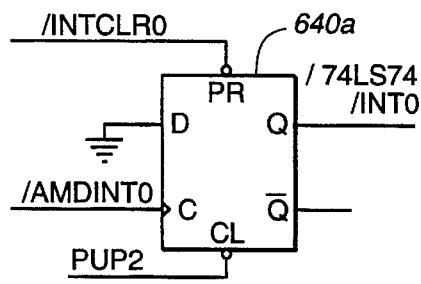
FIG._8A
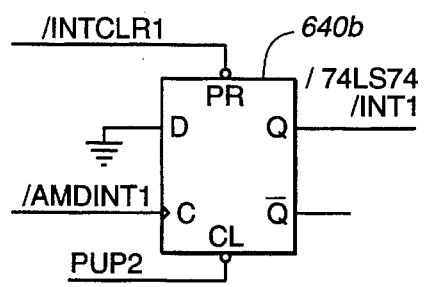
FIG._8B
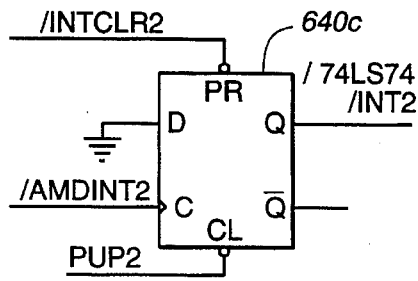
FIG._8C
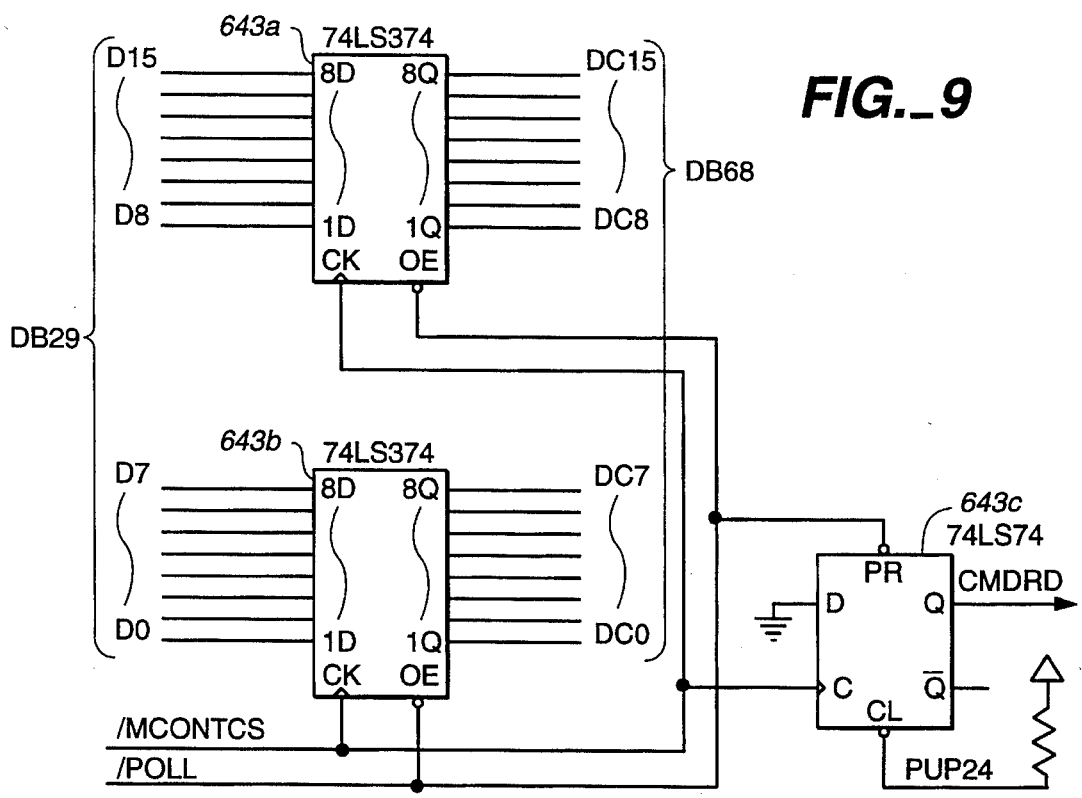
FIG._9

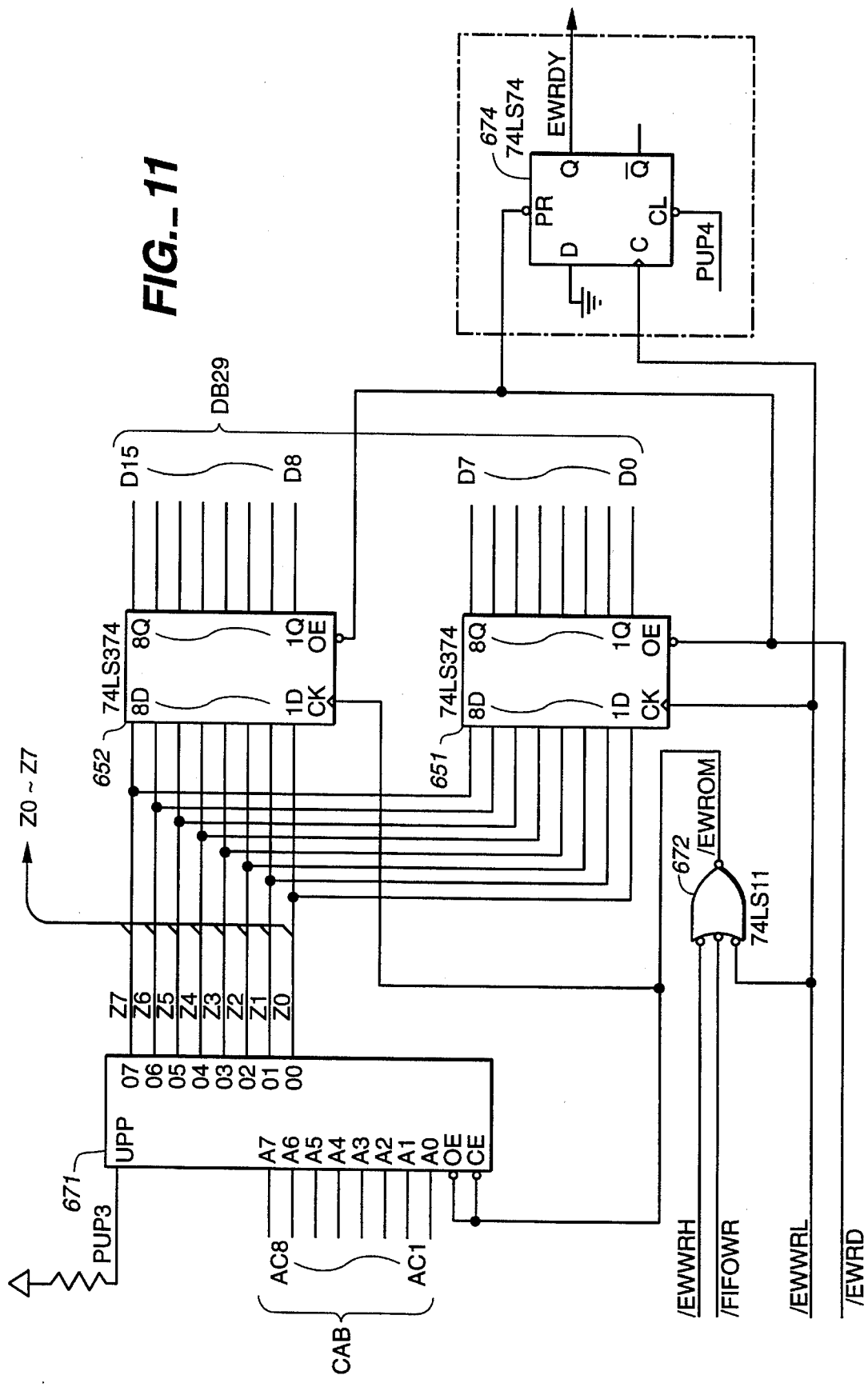
FIG._11

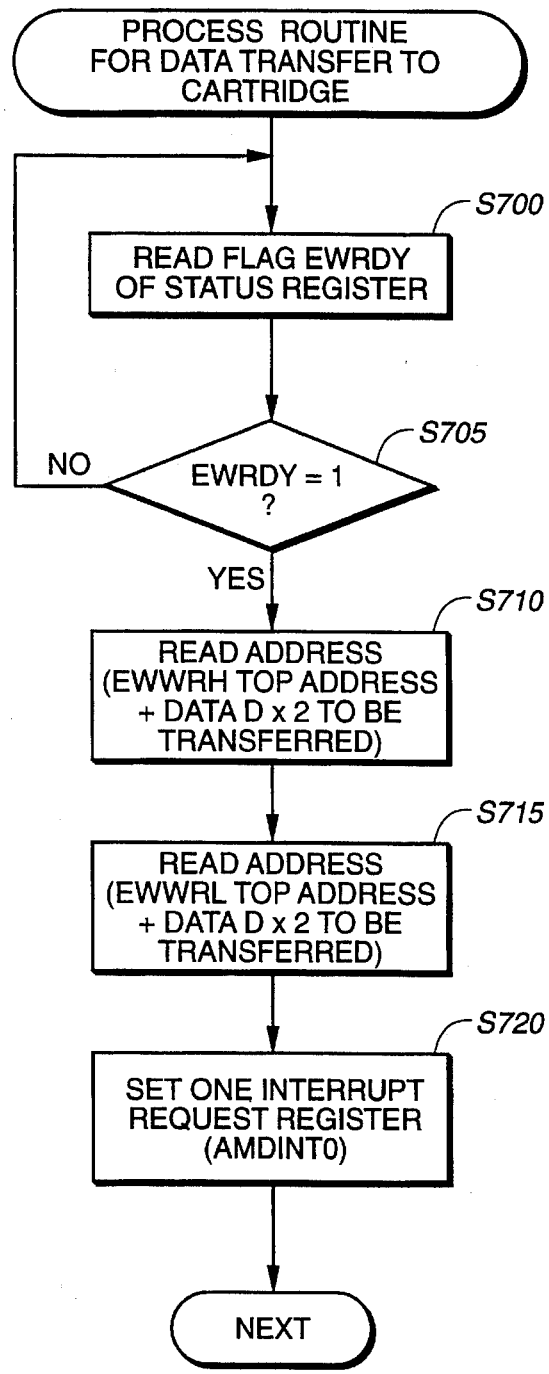
FIG._12
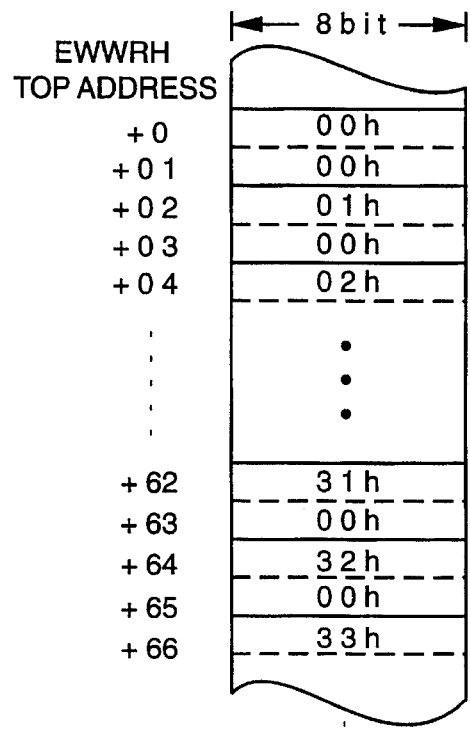
FIG._13
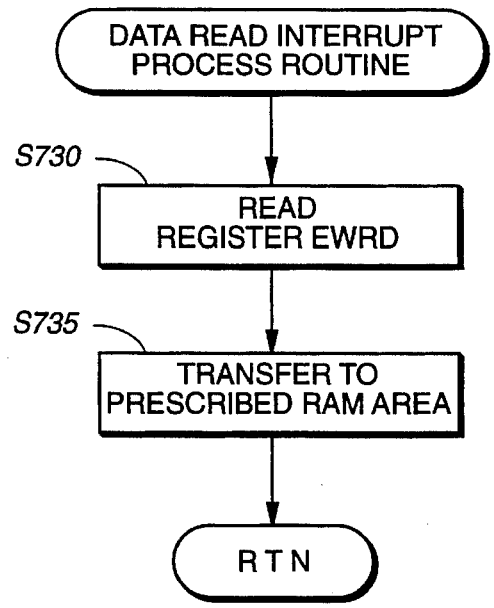
FIG._14

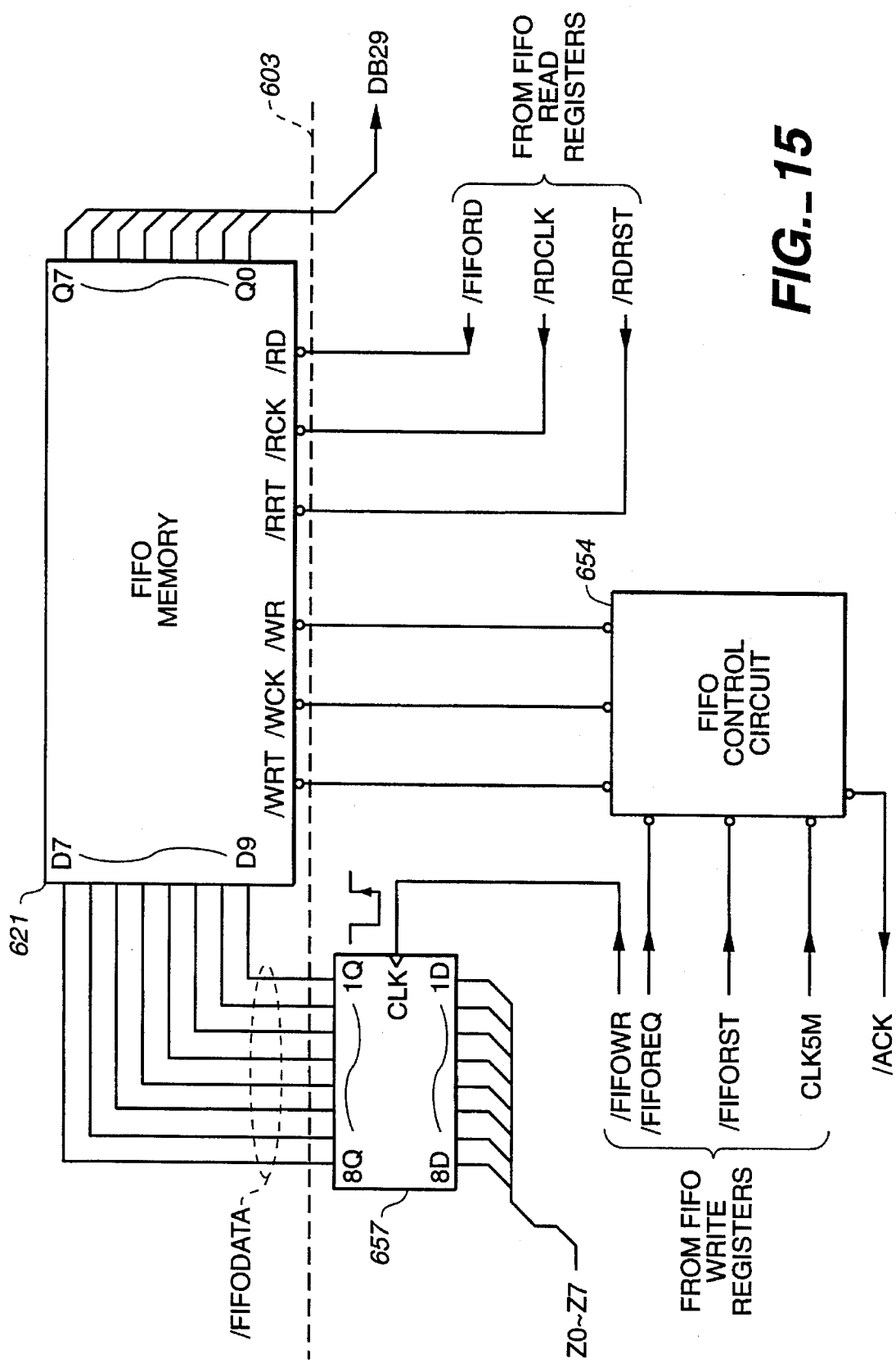
FIG._15

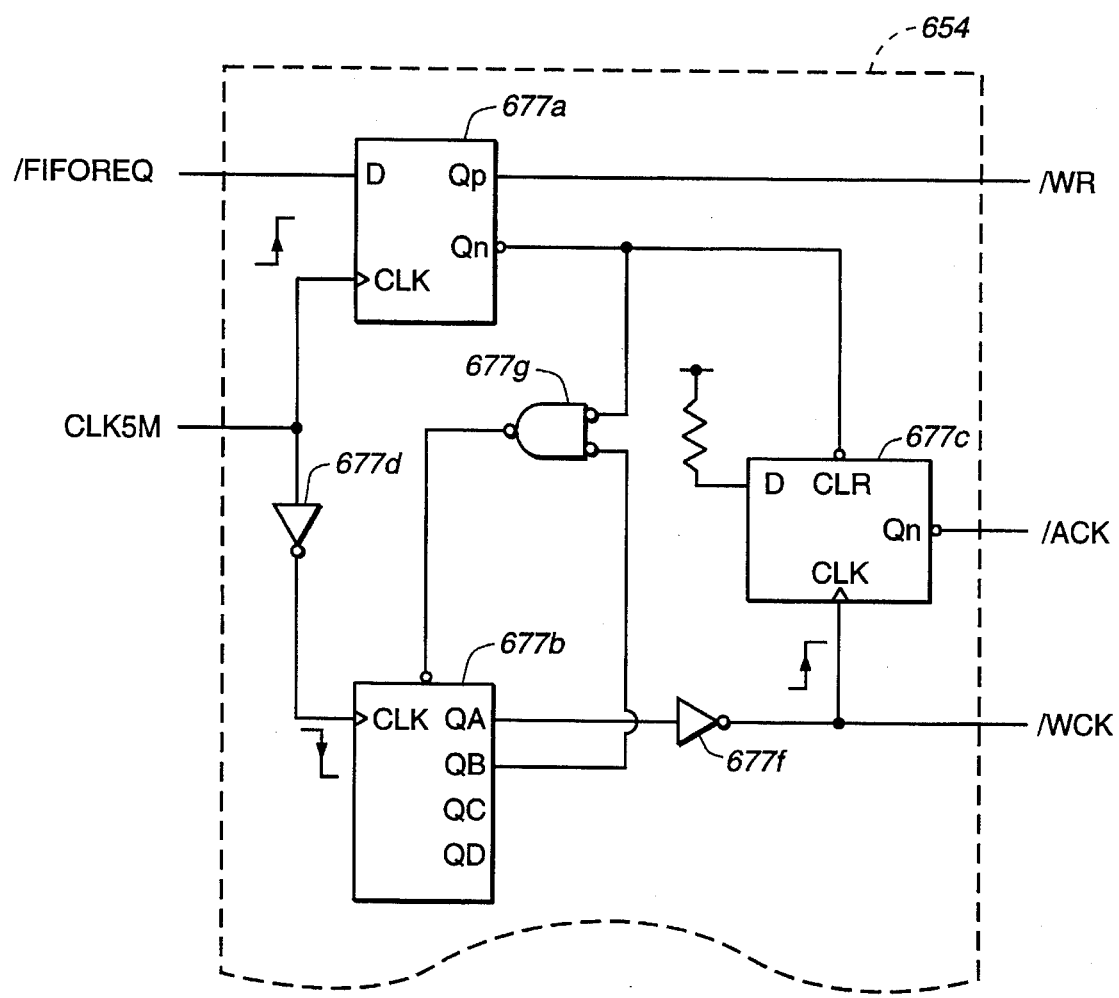
FIG._16

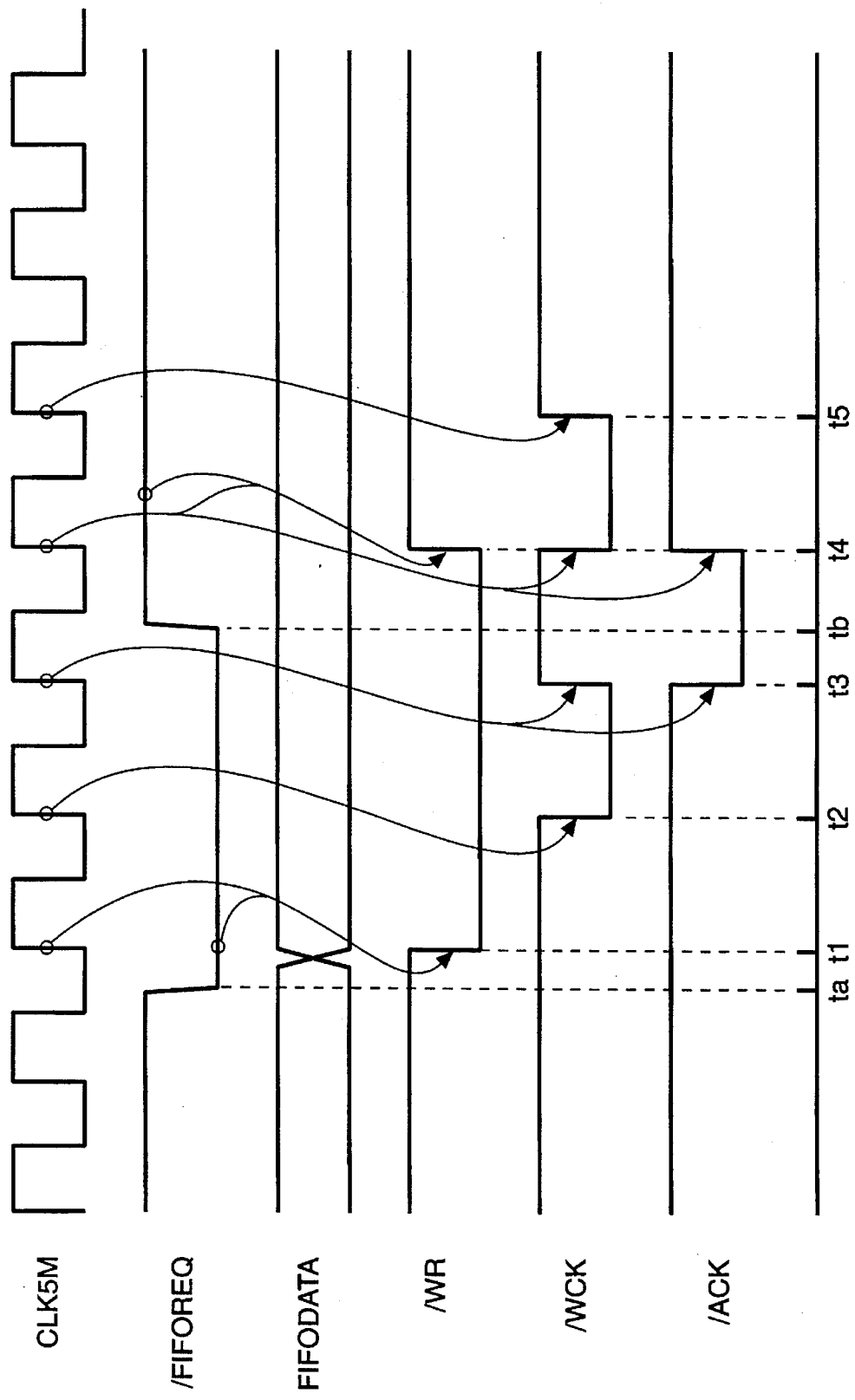
FIG._17

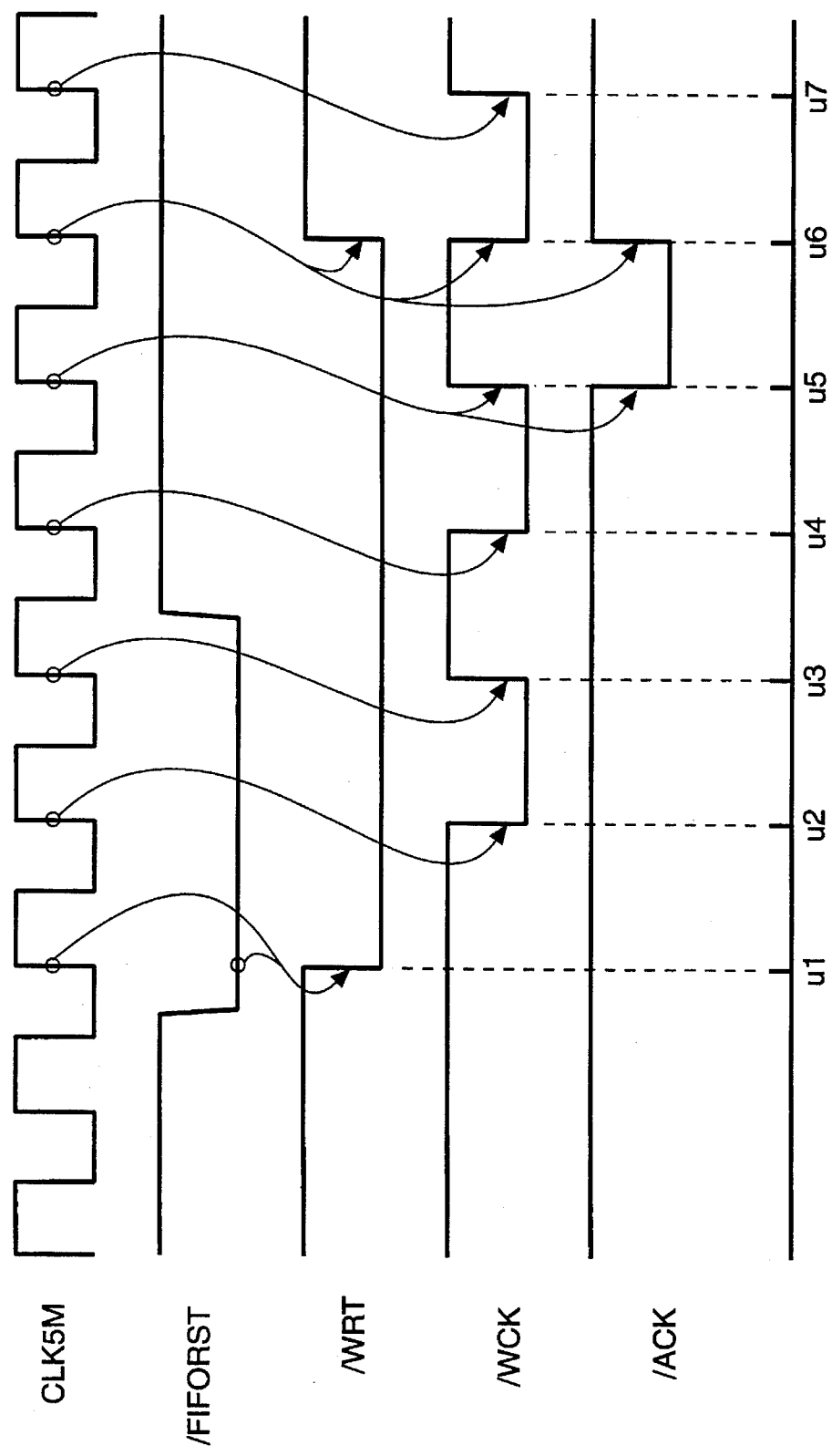
FIG._18

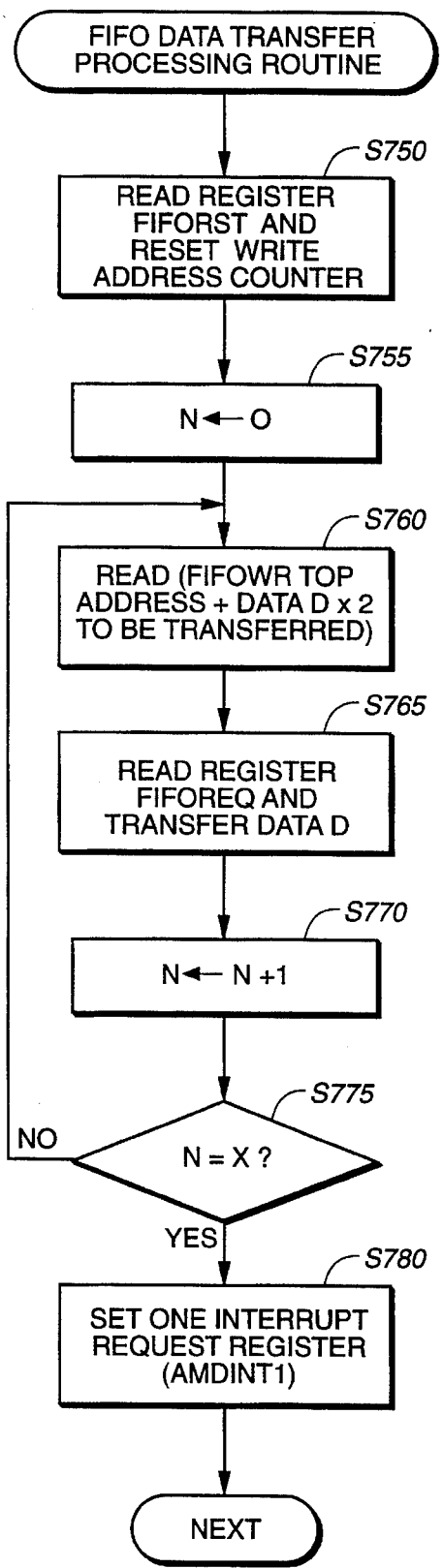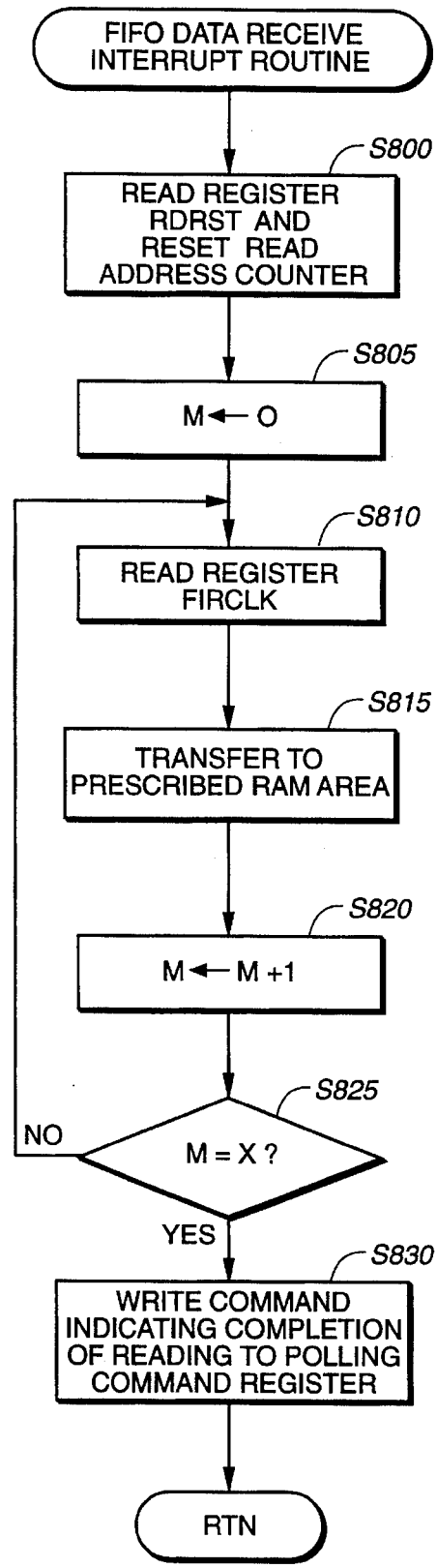
FIG._19          FIG._20

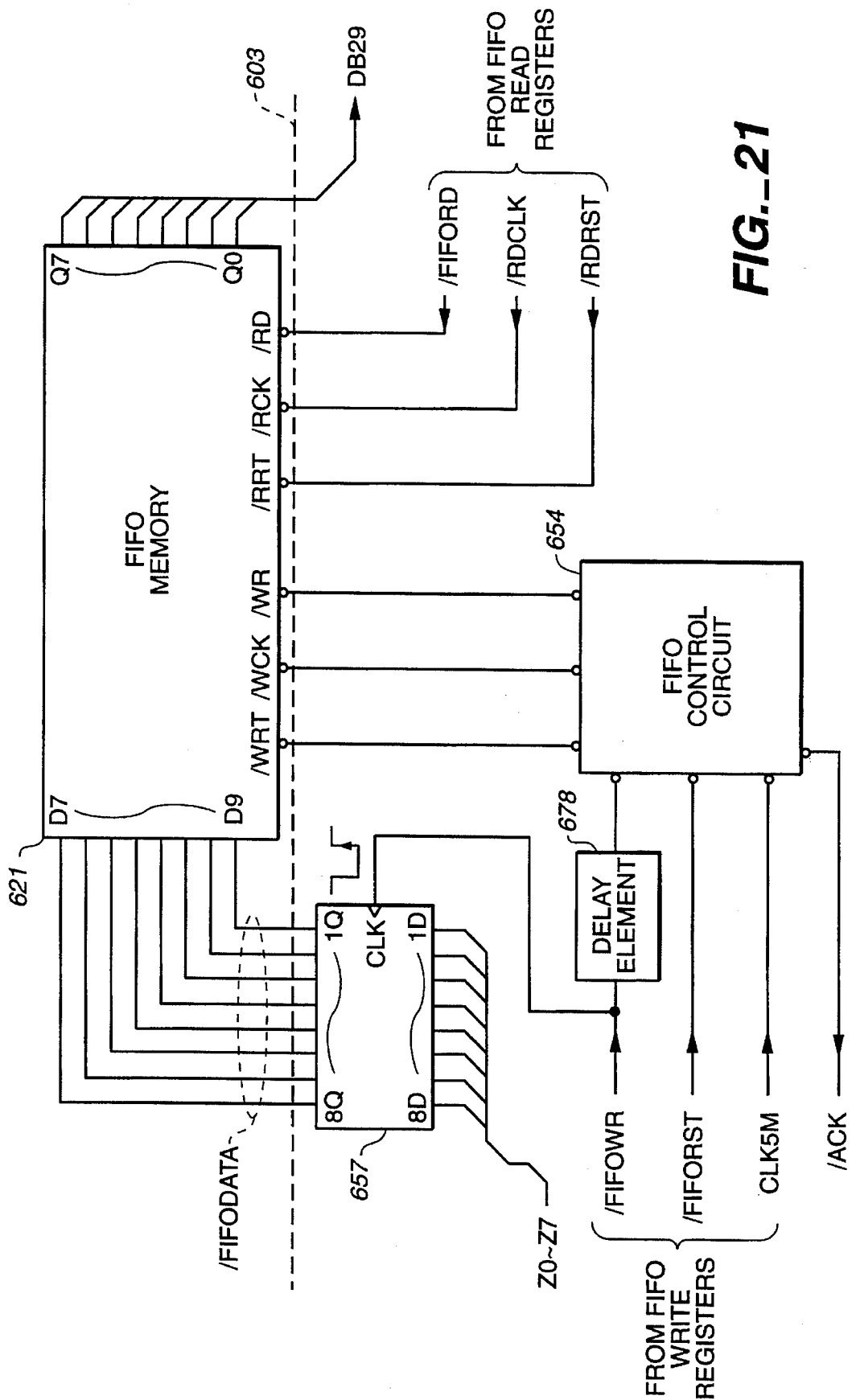
FIG._21

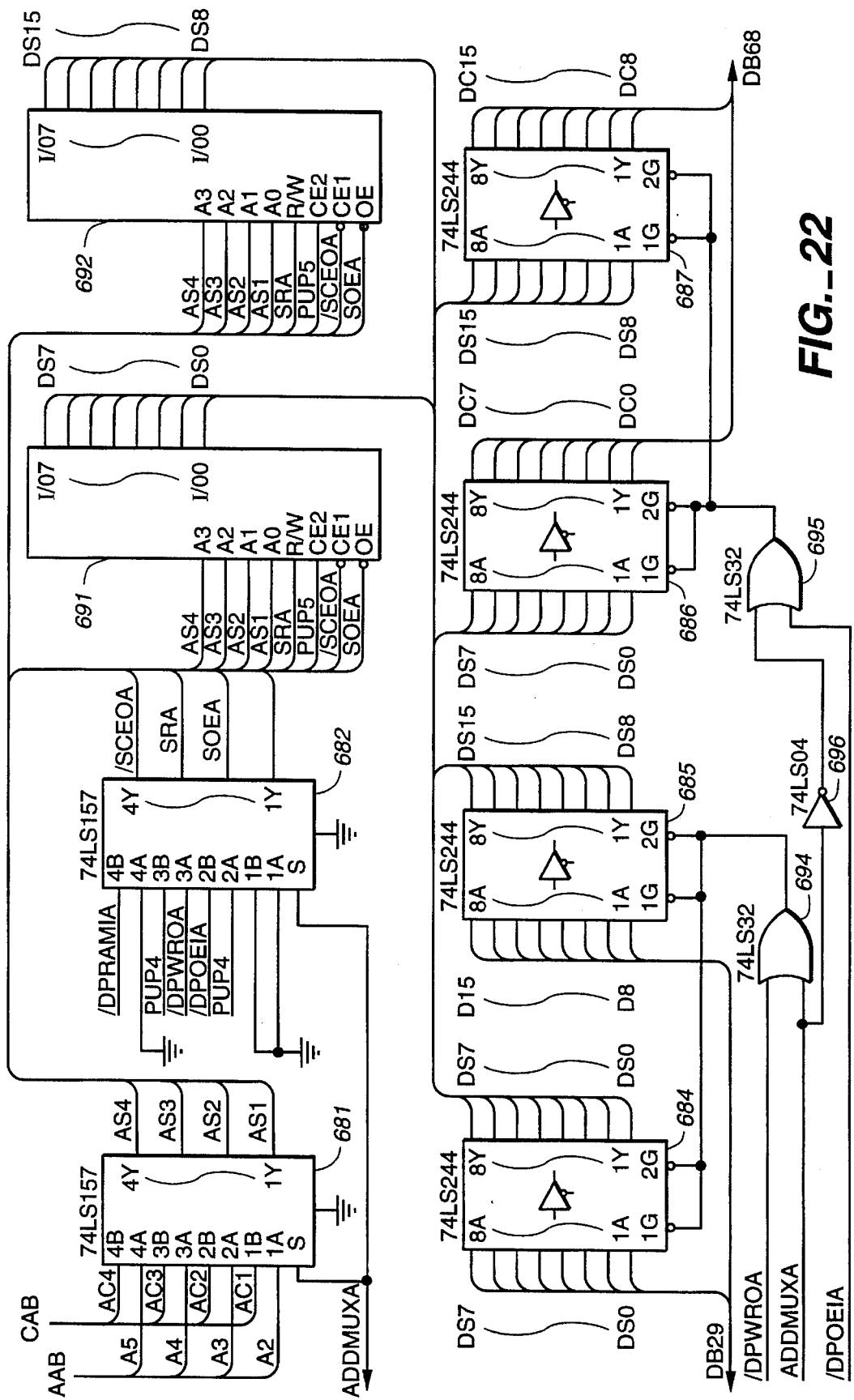
FIG._22

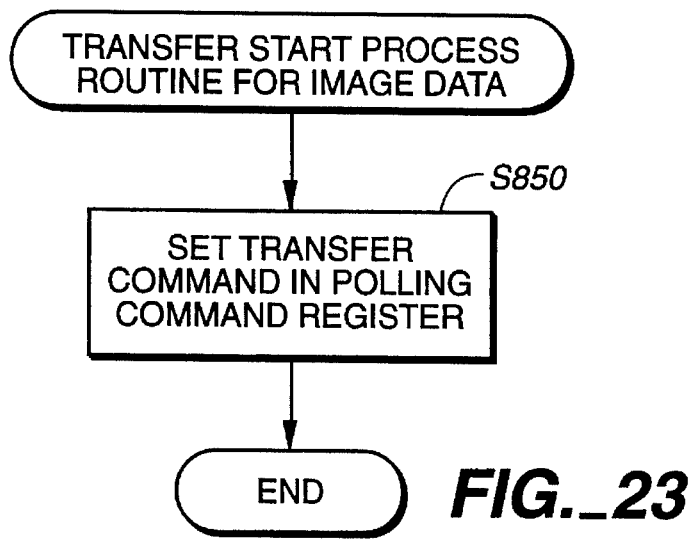
FIG._23
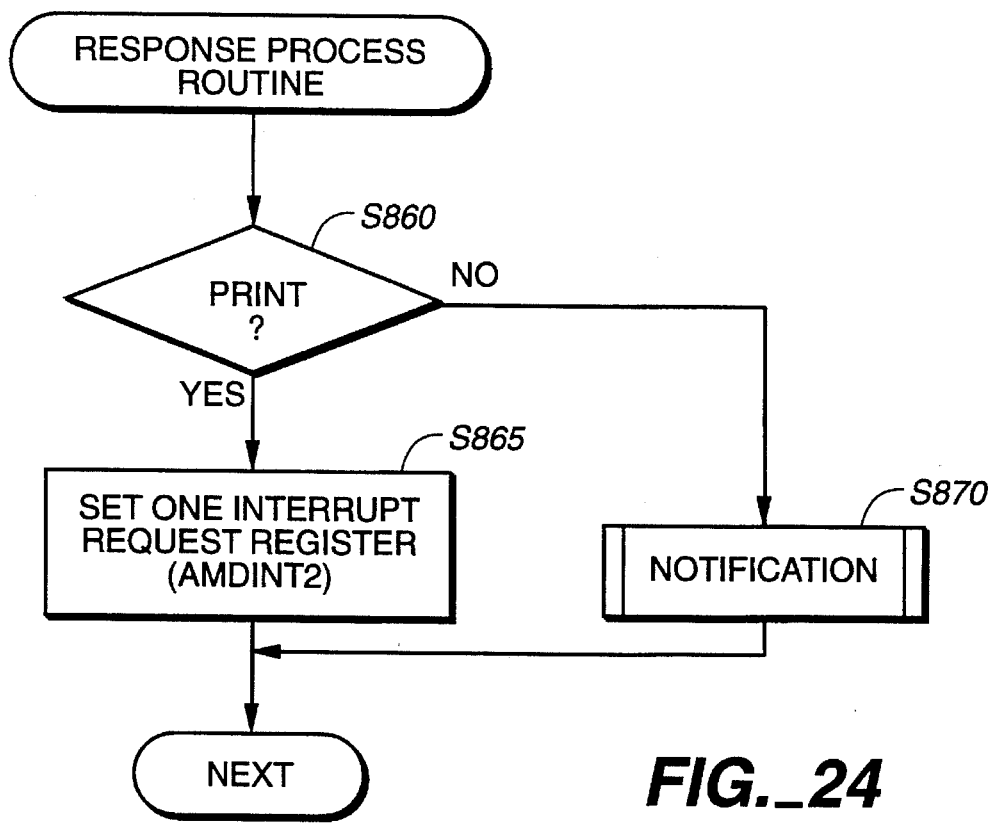
FIG._24

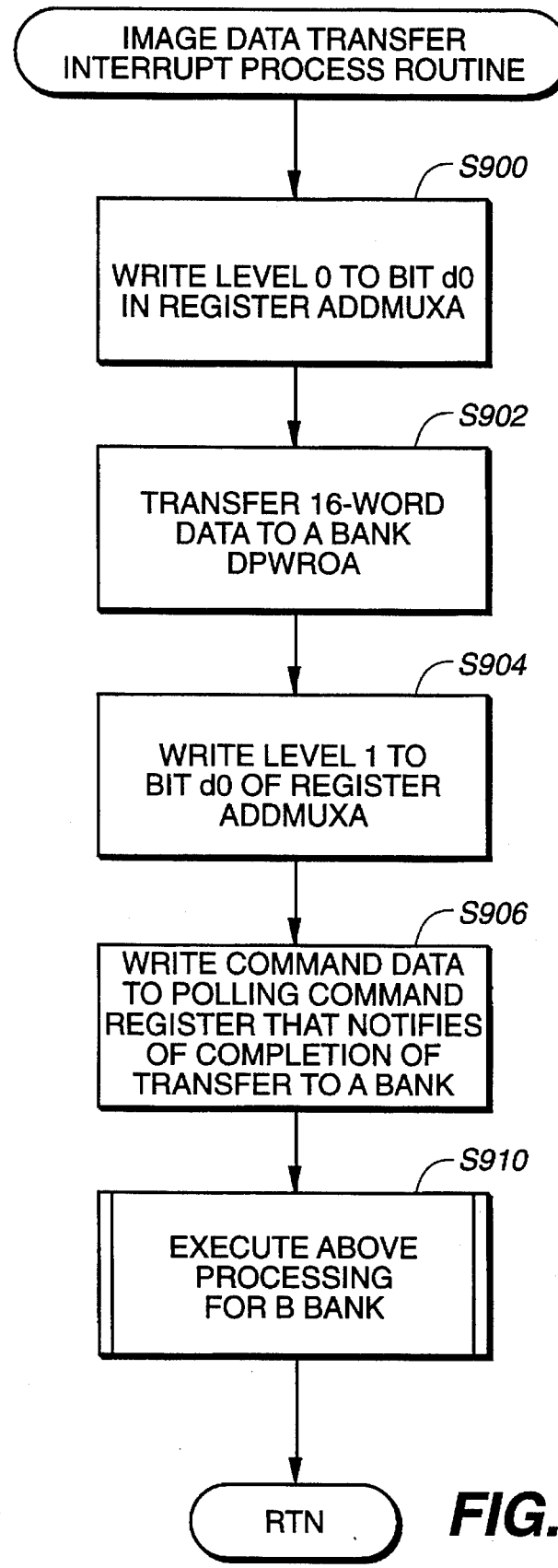
FIG._25

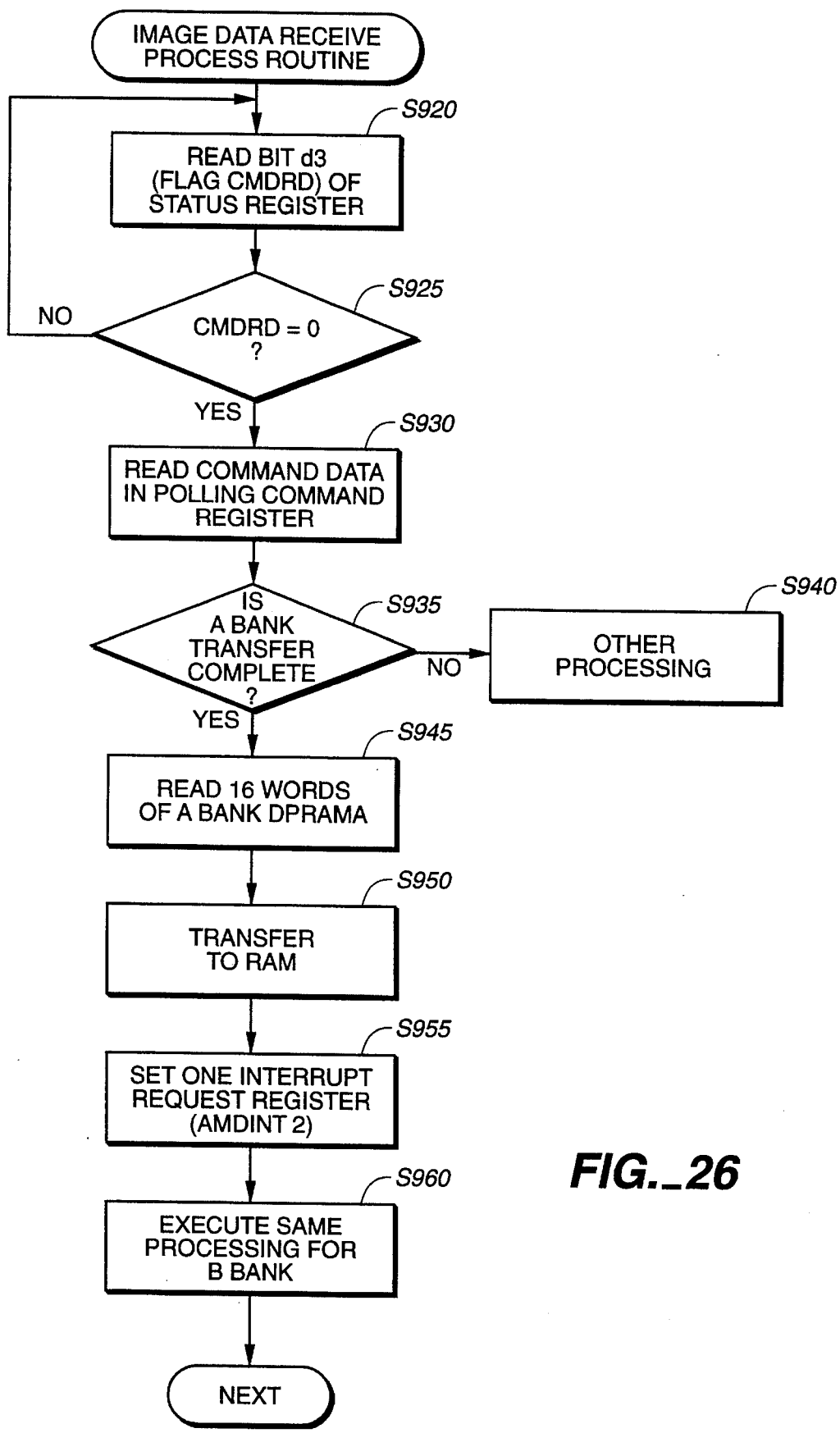
FIG._26

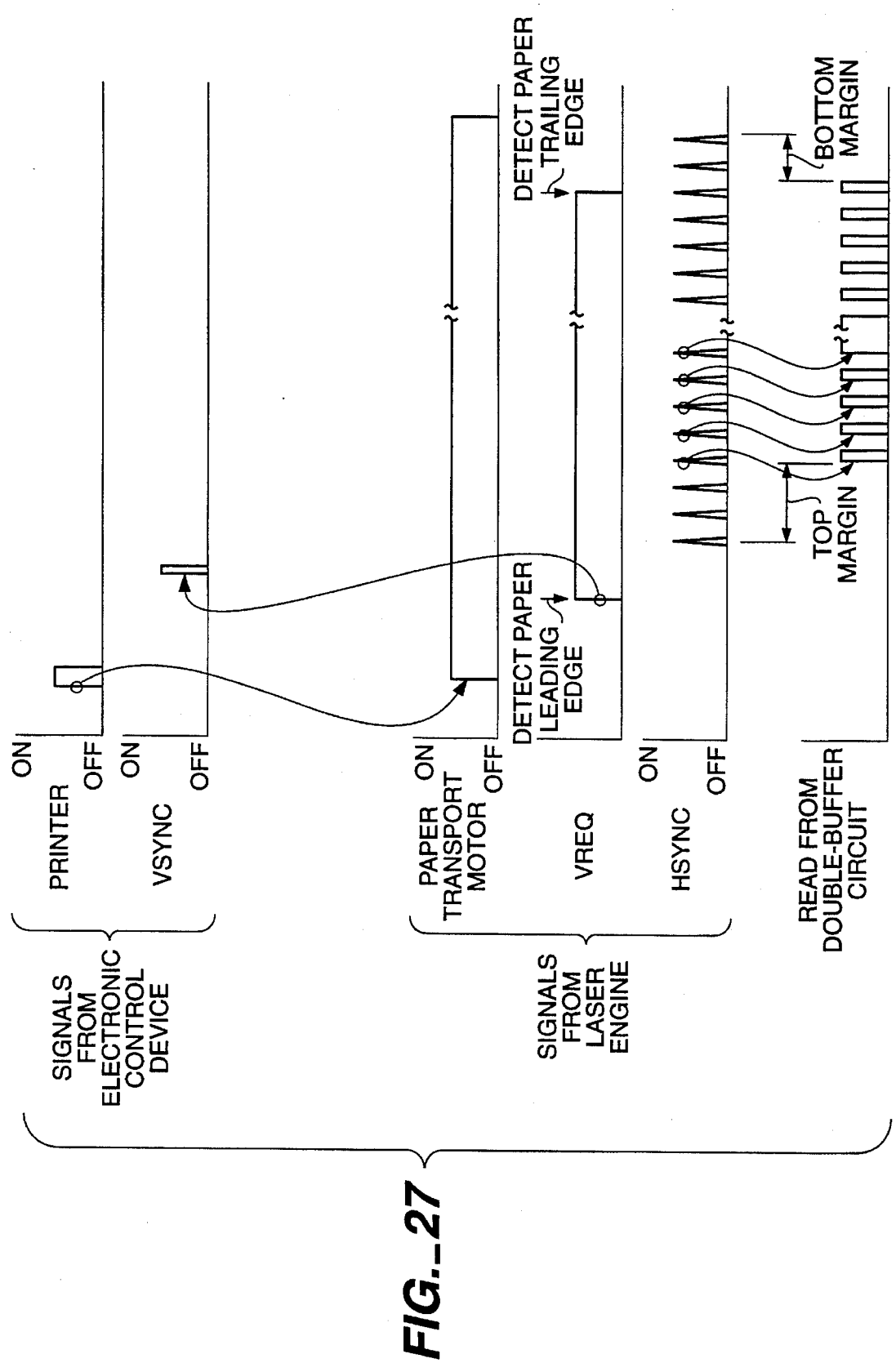
FIG._27

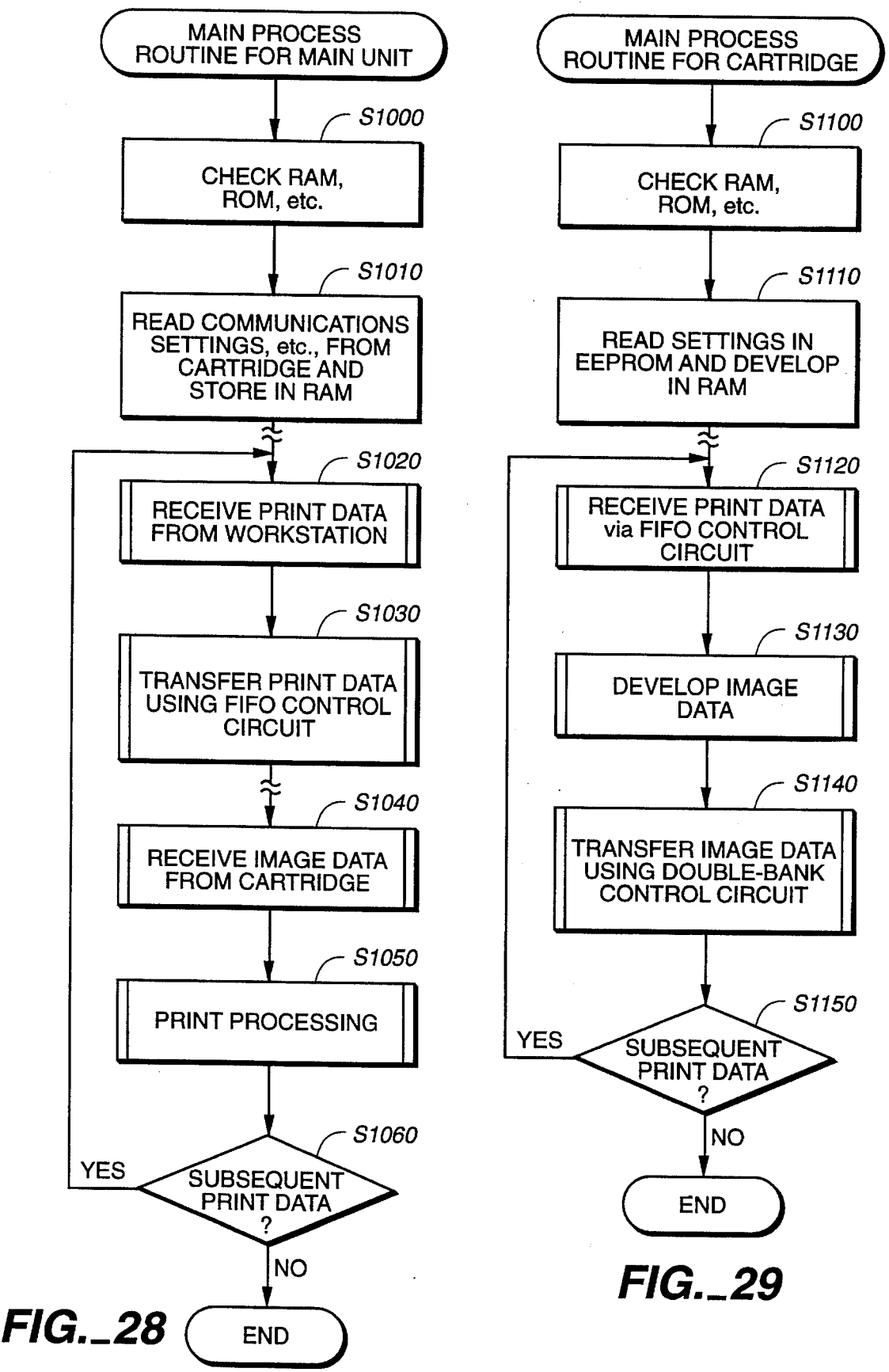
FIG._28
FIG._29

ACCESSORY CONTROL DEVICE WHICH TRANSFERS DATA FROM ELECTRONIC DEVICE USING PART OF ADDRESS SIGNAL AND LATCH

Cross References to Related Applications

This application is related to the following other applications:

"INTELLIGENT CARTRIDGE FOR ATTACHMENT TO A PRINTER TO PERFORM IMAGE PROCESSING TASKS IN A COMBINATION IMAGE PROCESSING SYSTEM AND METHOD OF IMAGE PROCESSING", Wakabayashi et al., Ser. No. 07/816,455, filed Dec. 30, 1991.

"INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/883,753, filed May 15, 1992.

"INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/835,537, filed Jun. 8, 1992.

"ADD-ON ELECTRONIC DEVICE AND ELECTRONIC SYSTEM", Wakabayashi et al., Ser. No. 07/854,643, filed Jul. 1, 1992.

"TEMPERATURE CONTROL FOR ADD-ON ELECTRONIC DEVICES", Wakabayashi et al., Ser. No. 07/907,988, filed Jul. 1, 1992.

"APPARATUS TYPE IDENTIFICATION DEVICE AND METHOD THEREFOR", Wakabayashi et al., Ser. No. 07/910,851, filed Jul. 2, 1992.

"INFORMATION PROCESSING DEVICE AND THE ACCESSORY CONTROL DEVICE AND INFORMATION PROCESSING METHOD IT USES", Wakabayashi et al., Ser. No. 07/910,851, filed Jul. 7, 1992.

"INFORMATION PROCESSING DEVICE AND THE ACCESSORY CONTROL DEVICE AND INFORMATION PROCESSING METHOD IT USES", Wakabayashi et al., Ser. No. 07/911,558, filed Jul. 7, 1992.

Background of the Invention

1. Field of the Invention

The present invention relates to information processing devices made up of various types of electronic devices and the accessory control devices installed in them and that essentially control these electronic devices and improve, change or add to their performance, and that have a configuration that transfers multiple data from the electronic device to the accessory control device. Further, the invention relates to the accessory control devices and information processing methods used in these information processing devices.

2. Related Art

In recent years, personal computers, word processors, workstations and other electronic devices founded on digital operation, and printers, facsimile machines, electronic pocketbooks, electronic musical instruments, electronic cooking appliances, electronic cameras and other electronic devices containing microprocessors are being used in all areas of society. Further, the use of microprocessors is spreading to automobiles, robots and machine tools, as well as all types of electric products.

Devices founded on this type of digital logic operation have the potential of flexible control or processing of data as compared with simple feedback control realized with hardware only, and they also have the advantage of being able to change essential functions by changing the software. Therefore, it is possible to realize completely different control within the same hardware by just changing the contents of the ROM where procedures are stored or loading a new program to the main memory from an external device such as a floppy disk. Another advantage is the ability to upgrade functions by just changing the software.

In personal computers, for example, accelerators are used which improve the functionality of the entire computer by completely replacing the microprocessor, but this requires replacement of the CPU on the motherboard or other difficult operations that cannot by performed by just anyone. Normally, no consideration has been made regarding the improvement or changing of the functionality of printers, facsimile machines, electronic pocketbooks, electronic musical instruments, electronic cooking appliances, electronic cameras and other consumer electronics containing a microprocessor, electrical equipment for automobiles, robots, machine tools and other industrial electronic apparatus, and all types of electric appliances. This problem is described in detail below using a page printer as an example.

In recent years, the diffusion of laser printers and other page printers has become extremely widespread, and high speed output devices for data from computers have become common. In the case of laser printers, their resolutions range from 240 to 800 dots per inch (DPI), and printers capable of printing several pages a minute are being developed. These printers employ a xerography unit that uses a photosensitive drum as the engine for printing, and since they continuously perform each of the charging, exposure, toner application and transfer processes in sync with the rotation of the photosensitive drum, printing processing begins after the image for a single page is stored in memory.

Therefore, the memory provided in page printers for image development must have the capacity to hold the image for at least one page, and if compression of image data is not performed, the capacity is determined by the resolution and the size of the paper that can be processed. For example, in the case of a resolution of 300 DPI and a paper size of 8 inches by 10 inches, then 7,200,000 (8×10×300×300) dots must be manipulated and at least a 0.9-megabyte memory is required.

In printers with a function that receives character codes, row and column pitch and other information as print data and expands this into the image, or in printers that receive a program described by a page description language and expand the image by interpreting it, it is necessary to calculate and produce a bit image based on this print data, which greatly reduces the overall processing speed compared to simple bit image transfer. That is, the processing speed of a printer is determined mainly by the throughput of the processor that performs processing and memory access time and falls far short of the printing throughput of the xerography unit itself.

For example, in a page printer capable of printing 10 pages in one minute, only six seconds is allowed to prepare the image data for one page of printing, and to develop all of this 0.9 megabytes of data in this period of time means that the processing time allowed for one byte is a mere 6.6 microseconds (6 s/0.9 MB). This processing speed can possibly be realized with one of the high speed RISC type processors currently available on the market. In contrast to this, there are currently many xerography units capable of printing 10 pages per minute. Therefore, the throughput of the controllers that process print data has become a bottleneck in improving overall print speeds.

For this reason, there are cases in which the image developing throughput is always below the xerography unit's throughput in prior art laser printers, and even if it becomes possible to obtain a processor with a high image developing throughput as microprocessor technology advances, it is impossible to improve functionality later. There are some page printers whose functionality can be improved by being able to increase internal memory capacity or by providing an expansion slot and installing a cartridge with built-in fonts or programs in it, but attempts to improve processing speed through memory expansion do not improve throughput. For example, to expand the functionality of a laser printer that supports only a specific page description language to process another page description language, the program of the other page description language interpreter is supplied in the form of an IC card or other type of cartridge. This cartridge contains the program in the form of a mask ROM and is installed in the expansion slot of the printer.

The controller of the printer itself reads a prescribed address assigned to the cartridge according to a certain timing, such as immediately after powering on. If the cartridge which contains the page description language program has been installed, a specific code is returned, whereby the controller knows that the cartridge is the page description language. By this means, control of the printer is transferred to the interpreter program in the cartridge. As a result, the printer becomes capable of interpreting data received from outside it according to this page description language, but processing speed itself is not improved, and in fact the overall printing speed may even be reduced by employing a new high level page description language.

This problem is not limited to page printers and is common to printers, facsimile machines, electronic pocketbooks, electronic musical instruments, electronic cameras and other consumer electronic devices having a microprocessor, electrical equipment for automobiles, robots, machine tools and other industrial electronic apparatus, and all types of electric appliances.

SUMMARY OF THE INVENTION

The present invention contrived as an information processing device is an information processing device comprising an electronic device equipped with a first processor capable of logic operation, a first memory means that stores the processing executed by the processor and a connector connected to at least the address signal line or control signal of the first processor; and an accessory control device connected to the connector; wherein the electronic device is equipped with a multiple data output means that sequentially outputs multiple data to be transferred to the accessory control device; and the accessory control device is equipped with memory means for transfer that stores the written data in a prescribed order, and data write means that writes the multiple data output from the electronic device to the memory means for transfer.

The multiple data output from the electronic device to the accessory control device are stored in the memory means for transfer in a prescribed order and become usable by the accessory control device.

Here, when a signal line is connected that is capable of data output, the output of the data from the electronic device to the accessory control device can be performed by utilizing this signal line, but there are cases in which the accessory control device has only a read-only signal as seen from the electronic device. In these cases, the multiple data output means of the electronic device can be, for example, a transfer data output means that reflects the data to be output in at least an address signal or a control signal and outputs the signal via the connector; and the accessory control device can be equipped with a data-hold means that fetches the data reflected in the address signal or control signal output from the electronic device from the signal and holds it, and write means drive means that operates the data write means at a prescribed timing when data is being held in the data-hold means.

By means of this configuration, it is possible to utilize a read-only signal line to output a signal. Moreover, when an address signal or a control signal is used, it is necessary to temporarily hold the output data and the holding of data and the writing of data to the memory means for transfer are essentially performed separately, but by operating the data write means at a prescribed timing when data is held by the write drive means, the transfer of data is performed by a single routine as seen from the electronic device.

The accessory control device can have a configuration that does not include a processor, but in order for the accessory control device to change, add to or improve the processing capability of the information processing device to which it is attached, it is desirable that it have a second processor that executes processing separate from the first processor of the electronic device and a second memory means that stores routines executed by the second processor and that the second processor read out data from the memory means for transfer and also process at least part of the data read out.

Generally a first-in first-out semiconductor memory is used as the memory means for transfer, but a ring memory, etc., may also be used.

In another configuration that can be considered for transfer of data using a read-only signal line, the transfer data output means of the electronic device is equipped with a signal conversion means that reflects the data to be transferred in temporal changes in an address signal or a control signal; and the data-hold means of the accessory control device is equipped with fetch means that reads the temporal changes in the address signal or control signal output by the transfer data output means, data restoration means that restores the data from the temporal changes read, and hold means that holds the restored data. Depending on the configuration of the signal line, the size of the allowed address space, and other conditions, an efficient configuration can be realized.

The data transferred to the accessory control device by the electronic device may include data generated exclusively by the electronic device, but cases can also be considered in which data received by the electronic device from an external device are transferred as is to the accessory control device. In this case, the information processing device comprises an electronic device equipped with a data fetch means that fetches data to be processed from the external device, a first processor capable of logic operation, a first memory means that stores the processing performed by the processor, and a connector connected to at least an address signal line of the first processor, and an accessory control device connected to the connector, wherein the electronic device is equipped with a means that reflects a condition corresponding to the received condition of the data from the external device as is in the address signal output to the connector, and the accessory control device is equipped with a memory means for transfer that stores the written data in a prescribed order, a means that reads the address signal output from the electronic device as data from the external device, and a data write means that writes the multiple data that have been read to the memory means for transfer, whereby a configuration is enabled that transfers data from the external device as is to the accessory control device.

When the electronic device in which the accessory control device is installed forms a whole new information processing device, the processing executed by the first processor of the electronic device is often new. In these cases, a configuration can be employed in which the processing for the first processor can be held in the electronic device, or a third memory means can be provided in the accessory control device that stores the routine which is executed by the first processor in the electronic device and is equivalent to the multiple data output means of the electronic device, wherein the first processor is operated according to this procedure. In this case, since the procedure of the first processor can be determined by the accessory control device, it is easy to have the first processor execute processing in line with the functions the accessory control device is trying to realize.

The accessory control device can be configured as a cartridge equipped with a printed circuit board on which is mounted at least the second processor and having a case for housing the printed circuit board to facilitate its use as a single unit, thus making it easy to use.

In this case, the second processor should be positioned for effective radiation of heat while the accessory control device is mounted in the electronic device. For example, if more than half of the accessory control device extends out from the electronic device and cooling of the external part is better, then the second processor should be positioned inside the cartridge toward the trailing end of the direction of insertion, while if the majority of the accessory control device is housed inside the electronic device and the whole of the cartridge is cooled by the ventilated air inside the electronic device, then the second processor should be positioned where that cooling is efficient.

The accessory control device may process the received data and utilize it internally, or it may process the data fetched by the data fetch means and be equipped with a means that outputs the data after being processed to the electronic device so that the data can be utilized in the electronic device after being processed.

The applications of such information processing devices are extremely wide ranging. For example, the electronic device can be equipped with a display means that performs display of at least characters, graphics or color, and the accessory control device can be equipped with an image data generation means that generates image data displayed on the above device based on data transferred from the electronic device, whereby the information processing device can be applied to image processing in which there is much data to be processed and which requires much time to perform. This is because there is much demand for improved or different functions in electronic devices in the field of image processing.

The invention contrived as an accessory control device is an accessory control device connected via a connector to an electronic device equipped with a first processor capable of logic operation, a first memory means that stores the processing executed by the processor and a connector connected to at least an address signal line or a control signal line of the first processor, and is equipped with memory means for transfer that stores the written data in a prescribed order, and data write means that writes the multiple data output to the accessory control device by the electronic device in the memory means for transfer. The accessory control device is utilized in the information processing device explained above and its configuration and range of application are as varied as explained above.

The invention contrived as an information processing method is an information processing method performed by the electronic device, equipped with a first processor capable of logic operation, a first memory means that stores processing performed by this processor and a connector connected to at least an address signal line or a control signal line of the first processor, and the accessory control device connected to the connector working together; wherein in the electronic device the multiple data to be transferred to the accessory control device are sequentially output, and in the accessory control device the multiple data received via the connector are temporarily written to the memory means for transfer in a prescribed order, the written data is fetched, and the processing of information is performed based on the fetched data.

By means of this processing, multiple data is effectively transferred to the accessory control device and the overall information processing capability is improved.

BRIEF DESCRIPTION OF THE DRAWINGS

FIG. 1 is a block diagram showing the general configuration of the embodiment;

FIG. 2 is an exploded perspective view showing the configuration of cartridge 3 in the embodiment;

FIG. 3 is a plane view showing the top and bottom of the printed circuit board on which the processor, etc., are mounted;

FIG. 4 is an explanatory diagram showing the configuration of the signal lines in the connector CN11;

FIG. 5 is an explanatory diagram showing the address map of cartridge 3 as seen from electronic control device 2;

FIG. 6 is an explanatory diagram showing the address map of cartridge 3 as seen from microprocessor 601;

FIG. 7 is a block diagram showing the internal configuration of cartridge 3;

FIG. 8 shows circuit diagrams of an example configuration of the interrupt request registers 640;

FIG. 9 is a circuit diagram showing an example configuration of the polling command registers 643;

FIG. 10 is an explanatory diagram showing the contents of the status registers 645;

FIG. 11 is a circuit diagram showing an example configuration of the read control circuit 620;

FIG. 12 is a flowchart showing the processing of electronic control device 2 which realizes data transfer utilizing a read control circuit 620;

FIG. 13 is an explanatory diagram showing the structure of the data in ROM 671;

FIG. 14 is a flowchart showing the processing in cartridge 3 which realizes data transfer utilizing the read control circuit 620;

FIG. 15 is a block diagram showing an example configuration of the FIFO control circuit 623;

FIG. 16 is a block diagram showing an example of part of the configuration of the write control circuit 677 in the FIFO control circuit 623;

FIG. 17 is a timing chart showing the timing for writing data to the FIFO memory 621;

FIG. 18 is a timing chart showing the timing for reset of the same FIFO memory 621;

FIG. 19 is a flowchart showing the processing of the electronic control device which realizes data transfer utilizing the FIFO control circuit 623;

FIG. 20 is a flowchart showing the processing of cartridge 3 which realizes data transfer utilizing the FIFO control circuit 623;

FIG. 21 is a block diagram showing another configuration of the FIFO control circuit 623;

FIG. 22 is a circuit diagram showing an example configuration of the double-bank control circuit 624;

FIG. 23 is a flowchart showing the processing for starting data transfer utilizing the double-bank control circuit 624;

FIG. 24 is a flowchart showing the response processing in electronic control device 2 for same;

FIG. 25 is a flowchart showing the processing in electronic control device 2 which realizes data transfer utilizing the double-bank control circuit 624;

FIG. 26 is a flowchart showing the processing in cartridge 3 which realizes data transfer utilizing the double-bank control circuit 624;

FIG. 27 is a timing chart showing the timing of image data printing performed by controlling the laser engine 5;

FIG. 28 is a flowchart showing part of the main routine of electronic control device 2; and FIG. 29 is a flowchart showing part of the main routine of cartridge 3.

Other objects and attainments together with a fuller understanding of the invention will become apparent and appreciated by referring to the following description and claims taken in conjunction with the accompanying drawings.

DETAILED DESCRIPTION OF THE INVENTION

Embodiments of the invention are explained below using the attached drawings in order to describe the invention in more detail. The explanation of the embodiment covers a number of subjects so it is divided up into the following items.

A. Explanation of Overall Configuration
B. Structure of Cartridge
C Address Space of Cartridge
D. Internal Configuration of Cartridge
E. Explanation of Data Transfer Controller 103
F. Explanation of Registers
G. Configuration and Operation of Read Control Circuit 120
H. Configuration and Operation of FIFO Control Circuit 123
I. Configuration and Operation of Double-Bank Control Circuit 124
J. Printing of Image Data
K. General Processing and Changing of Settings
L. Effectiveness of First Embodiment A. Explanation of Overall Configuration This embodiment combines a cartridge 3 as the accessory control device to a laser printer 1 as the electronic device. Laser printer 1 uses a commonly known xerography unit, and the part that prints using a photosensitive drum functions independently as laser engine 5. An electronic control device 2, which performs control of the entire laser printer 1, can perform printing by only sending commands to laser engine 5 via a connector CN10 and transferring image data to a prescribed buffer.

Laser printer 1 receives print instructions from a workstation 7 and performs printing, and when cartridge 3 is not mounted, it executes printing based on prescribed control commands built into laser printer 1. Various types of control commands built into laser printer 1 have been proposed by printer manufacturers. For example, one set of control commands prepares the image for a page by setting the character pitch and line spacing via so-called escape sequences sent from workstation 7 and reading characters from a built-in font ROM corresponding to character codes sent from workstation 7. When cartridge 3 of is mounted in laser printer 1, however, laser printer 1 operates as a printer that develops the image via a page description language. An outline of the operation in this case is noted after the explanation of each part.

As shown in FIG. 1, inside electronic control device 2 are disposed a commonly used CPU (Motorola's MC68000 in this embodiment) 510, a ROM 511 that stores the programs executed by CPU 510, a RAM 512 where print data or image data subsequent to being developed are stored, an EEPROM 513 that stores 512 bytes of data in a nonvolatile condition, a data input port 514 that receives print data from host workstation 7, a line buffer 515 connected to a bus lines 516a (address) and 516b (data) which exchange data with cartridge 3, a register 517 for exchanging commands and status information with laser engine 5, a console panel I/F 519 that serves as the interface with a console panel 518 of laser printer 1, and a double-buffer circuit 520 where the image data to be transferred to laser engine 5 is stored.

The bus lines that connect these circuits include the usual address bus, data bus, interrupt control line and other various bus lines, but these have been simplified in the drawing. Line buffer 515 includes a one-way buffer connected to the data bus 516, and the data bus connected to connector CN11 is a read-only signal line as seen from CPU 510.

EEPROM 513 is an electrically erasable programmable ROM, in which data can be erased, written and read in one-byte units. Therefore, when CPU 510 rewrites data, it specifies an address, erases one byte, and writes the new data on top of that. Electronic control device 2 stores in EEPROM 513, for example, the conditions for data communication with workstation 7, e.g., communication baud rate, start bit, stop bit and parity bit, the initial selection setting when there are multiple paper trays, and what to do when an error occurs.

Some examples of the principal types of information stored in EEPROM 513 are given below. Information other than this can also be stored depending on the use.

(A) Items regarding the receiving of data by the laser printer 1 from the external workstation 7, etc.
  Interface specifications
    RS232C, RS422, specific LAN, parallel
  Specifications for serial communication
    Full/half duplex, baud rate, stop bit, parity, data length, etc.

(B) Items regarding printing
  Number of copies
  Selection of printing paper
    Upper/Lower, Manual insertion
  Printing of start page Yes, No
(C) Items regarding error modes
Print error description
Yes, No
Paper jam
Store or do not store image data of page on which paper jam occurred.

Electronic control device 2 refers to this information when the power is turned on or when it is required for processing.

Double-buffer circuit 520 is equipped with RAMs 520A, 520B, which are capable of holding 8 lines, i.e., 4-kilobyte capacity, for printing by laser engine 5, and image data from CPU 510 are written alternately to these RAMs by a memory write controller 520C. Laser engine 5 performs printing by alternately reading these two RAMs 520A, 520B via a memory read controller 520D and converting the image data to a video signal in sync with the rotation of the photosensitive drum. RAMs 520A, 520B are provided and written and read alternately because access from CPU 510 and access from laser engine 5 must be performed independently.

After CPU 510 has written data to one RAM, it sets a flag at a prescribed bit in register 517. In response, laser engine 5 checks this flag and reads the image data stored in the RAM where the data was written. During reading, it sets a flag at another bit in register 517 to let CPU 510 know which RAM is being read. Since the other RAM is not accessed by laser engine 5 at this time, CPU 510 writes the next 8 lines of image data to this RAM during this time. When laser engine 5 finishes reading from one RAM, it resets the flag and switches to reading from the other RAM. Since the speed with which CPU 510 writes data is faster than the speed with which laser engine 5 reads data, i.e., speed with which printing is executed, it is easy to avoid interference between memory access by the two and realize the reliable transfer of one page of image data.

Cartridge 3 is mounted in connector CN11 of electronic control device 2. Electronic control device 2 judges whether or not cartridge 3 is installed in connector CN11 at the time of power on, and if it is judged to be installed, then after resetting, etc., are performed in electronic control device 2, it jumps to a prescribed address in the ROM (described below) provided in cartridge 3, after which the processing provided in cartridge 3 is executed in sequence. Cartridge 3 interprets the program generated by the page description language and output from workstation 7 to laser printer 1 and develops it into image data, and laser engine 5 performs printing. This operation is described later.

B. Structure of Cartridge

Cartridge 3 is designed as a cartridge to be inserted in the cartridge insertion opening of the main printer unit. Cartridge 3 has a structure like that shown in the exploded perspective view in FIG. 2 in which a multilayer printed circuit board 550 (printed circuit board below) is inserted between an upper case 100 recessed on the inside and a plate-like lower case 120. A cap 140 is fitted on the connector side of printed circuit board 550. A microprocessor 601 and other circuit elements are mounted on printed circuit board 550. Both upper case 100 and lower case 120 are made from aluminum. Due to the high heat conductivity of aluminum, the heat generated by the internal elements can be effectively carried outside and released.

Two grounding spring members 122 for securing a ground connection with the main printer unit are fixed to the lower case 120 with rivets 124, and a cylindrically shaped piece of silicon rubber 126 for applying pressure on printed circuit board 550 up from below is fitted in a rubber retainer 128 on the inside surface of the lower case. Silicon rubber 126 for applying pressure pushes printed circuit board 550 directly below microprocessor 601 up. A sheet shaped piece of silicon rubber 102 for radiating heat is positioned between the top surface of microprocessor 601 and the inside surface of upper case 100 to improve contact and heat conductivity. Silicon rubber 126 for applying pressure pushes up on printed circuit board 550 which in turn pushes up microprocessor 601, whereby contact between microprocessor 601 and silicon rubber 102, and between silicon rubber 102, and upper case 100 is improved. As a result, heat is efficiently radiated up from microprocessor 601.

In assembly, first upper case 100 is turned upside down and silicon rubber 102 for radiating heat is fixed in a prescribed position on upper case 100, after which printed circuit board 550 is secured to the inside of upper case 100 by one screw 160. Lower case 120 is then fitted in upper case 100 and each of the corners are secured in place with screws 162. Cartridge 3 is then completed by inserting a cap 140 in the cap opening between upper case 100 and lower case 120.

FIG. 3A is a plane view showing the top of printed circuit board 550, and 3B is a plane view showing the bottom of printed circuit board 550.

As shown in FIG. 3A, microprocessor 601 is attached at one end to the top surface of printed circuit board 550, and at the other end is formed an insertion plug 551 in which multiple electrodes are formed in a row for connecting to the connector of the main printer unit.

On each of the sides of printed circuit board 550 near microprocessor 601 are disposed two ROMs 606 to 609 for storing the control program, etc., for microprocessor 601. Four tristate buffers 617 are disposed in a square pattern in the center of printed circuit board 550 next to microprocessor 601. Four dynamic RAMs 611 to 614 are arranged in a row between ROMs 606 to 609 and plug 551 and between tristate buffers 617 and plug 551. To simplify the drawing, the wiring pattern formed on the top of printed circuit board 550 is omitted.

Microprocessor 601 is a pin grid array (PGA) type element, and the other elements are SOJ types, SOP types or QFP types. AMD Corporation's Am29030 RISC processor (25-MHz clock frequency), for example, is used as microprocessor 601.

As shown in FIG. 3B, plug 551 is also formed at one end on the bottom surface of printed circuit board 550. Further, pins 601p of microprocessor 601 protrude at the other end. Two tristate buffers 619 are disposed on each side of microprocessor 601. Application Specific Integrated Circuit (ASIC) 603, which contains the control circuit and registers for microprocessor 601, is disposed in a position in the center of printed circuit board 550 toward plug 551.

EEPROM 670, which stores the configuration of the main printer unit (number of pages to be printed, paper size, margins, fonts, communication parameters and other parameters related to the operation of the printer), is disposed on the side of printed circuit board 550 near the ASIC 603. Next to EEPROM 670 is disposed a ROM 618, which stores the program for operating the microprocessor of the main printer unit.

On the side opposite EEPROM 670 are disposed two oscillators 661 and 665. The first oscillator 661 is an element that generates a signal which becomes the basis for the clock signal of microprocessor 601 and generates a 50-MHz clock signal, for example. The second oscillator 665 is an element that generates a clock signal for use in the interval timer processor and generates a 5-MHz clock signal RCLK, for example. By providing an oscillator 661 exclusively for microprocessor 601 in this way, the clock frequency of microprocessor 601 can be easily changed by only replacing the oscillator 661.

Next to the oscillator 665 are disposed the reset element 637, the FIFO memory 621 and the NAND gate 680 in a row along the edge of printed circuit board 550. Five tristate buffers 684 to 688 are disposed in a row parallel to the plug 551.

As shown in FIG. 3, the longitudinal direction of rectangular elements is arranged in the direction of insertion of cartridge 3 on both the top and bottom of printed circuit board 550. This arrangement facilitates the flow of air, as indicated by the arrows, from the plug 551 toward microprocessor 601, thus contributing to cooling of microprocessor 601.

FIG. 4 shows the wiring relationship between the plug 551 formed on the end of printed circuit board 550 and the connector CN11. The plug 551 has 25 terminals formed on each of the two sides (A side and B side) of the two-sided printed circuit board. FIG. 4 lists the signal names corresponding to each of the terminals of the plug 551. The slash (/) attached to the front of signal names indicates that the signal is low active. The meaning of each of the signals is as follows.

Signal /ASB: address strobe signal output by CPU 510 (MC68000, Motorola Corporation).

Signal /UDS: upper data strobe signal output by CPU 510.
Signal /LDS: lower data strobe signal output by CPU 510.

Signal /ADS: auxiliary address strobe signal generated in electronic control device 2 based on the address strobe signal /ASB. This auxiliary address strobe signal /ADS demonstrates different behavior in different types of printers when the printer is initialized.

Signal /ODTACK: output data acknowledge signal for when data is transferred from cartridge 3 to electronic control device 2.

Signal /CTRGSEL: cartridge selection signal when CPU 510 selects cartridge 3 and accesses the ROM, register, etc., assigned to the address space inside the cartridge.

Signals A1–A20: address signals output by CPU 510.

Signals D1–D15: output signals from cartridge 3.

Signal R/W: read-write signal output by CPU 510.

Signal SCLK: clock signal output from the oscillator (not shown) built into the laser printer 1.

The signal /CTRGS supplied to the laser printer 1 becomes low level when cartridge 3 is inserted, and CPU 510 detects that cartridge 3 has been inserted in the connector CN11 by this. CPU 510 specifies word addresses using the 23-bit address signals A1 to A23, and it specifies the upper byte and lower byte of each word using the signals /UDS and /LDS. As a result, CPU 510 is capable of using the 16-megabyte address space from 000000h to FFFFFFh. The "h" added to the end of the address here is a hexadecimal indicator.

C Address Space of Cartridge

This cartridge 3 is assigned to part of the address space handled by CPU 510 in electronic control device 2. CPU 510 handles the 16-megabyte address space from 000000h to FFFFFFh, and part of that is set aside for the ROM cartridge. The space assigned cartridge 3 differs depending on the type of laser printer, but in the case of a Hewlett Packard laser printer, normally the 2-megabyte space from 200000h to 3FFFFFh or from 400000h to 5FFFFFh is assigned as shown on the left side of FIG. 5.

Microprocessor 601 disposed in cartridge 3 of this embodiment is a 25-MHz AMD29030 produced by AMD Corporation, and the address space it can handle is 4 gigabytes from 00000000h to FFFFFFFFh. This address space is assigned to not only ROM or RAM but also to the various registers, etc., used to exchange data with electronic control device 2 in the printer. This is shown in FIG. 6. Below, the internal electrical configuration of cartridge 3 is explained together with the address space assignments for both microprocessors.

D. Internal Configuration of Cartridge

The internal configuration of cartridge 3 is shown in FIG. 7. As shown in the figure, cartridge 3 is configured around microprocessor 601, which handles all control, and comprises mainly the memory section 602 made up of the ROM, RAM and their peripheral circuitry, the data transfer controller 603, which handles all exchange of data with electronic control device 2, and other circuits.

Memory section 602 comprises ROMs 606 to 609, totaling 2 megabytes, where the programs executed by microprocessor 601 are stored, selector 610 for facilitating use of ROMs 606 to 609 by bank switching, and RAMs 611 to 614, totaling 2 megabytes, where the print data from electronic control device 2 are stored or the image data after being developed are stored. ROMs 606 to 609, totaling 2 megabytes, are each 4-megabit (16 bits×256 kilobits) mask ROM, and as shown in FIG. 6, they are assigned the address space 00000000h to 001FFFFFh. ROMs 606 and 607 and ROMs 608 and 609 each make up a bank, and each bank of two make up a 32-bit data bus. ROMs 606 to 609 and microprocessor 601 are connected via the address bus AAB and the control signal bus. Data bus IDB of ROMs 606 to 609 is connected to data bus DB29 via data selector 610, whereby microprocessor 601 is capable of reading data from ROMs 606 to 609.

Except for the least significant 3 bits (A0, A1, A2) of the address bus AAB from microprocessor 601, all address signals are input to ROMs 606 and 607 and ROMs 608 and 609. The least significant 2 bits (A0 and A1) are not input because the reading of data by microprocessor 601 is done in 1-word=32-bit units (4-byte units). Also, since the address A2 is not assigned, when data of a prescribed area are read, the four ROMs 606 to 609 output data simultaneously. The data output simultaneously are adjusted by data selector 610. That is, since access of ROM by microprocessor 601 is often performed on consecutive addresses, two consecutive words, where one word is 32 bits, are read from ROMs 606 to 609 at one time, and when words that are actually consecutive are read, the bank to which the ROM belongs is sequentially switched by data selector 610 to facilitate the continuous reading of data. As a result, the reading of data in two consecutive words is extremely fast.

RAMs 611 to 614, on the other hand, are 16-bit×256-kilobit=4-megabit DRAM, and as shown in FIG. 6, they are assigned to the two megabytes of address space from 20000000h to 201FFFFh. The memory in cartridge 3 can be increased by 2 megabytes, for which the expansion RAM interface 615 is provided. This expansion RAM interface 615 is assigned to the address space from 20200000h to 203FFFFF?Fh. Up to 2 megabytes of SIMM type RAM can be installed in the expansion RAM interface 615. The data lines of RAMs 611 to 614 and the expansion RAM interface 615 are connected directly to the data bus DB29 of microprocessor 601, and the address lines are connected to address bus AAB of microprocessor 601 via the data transfer controller 603. The I/O of each of the registers, etc., described below is assigned to the address space beginning from 80000000h.

When cartridge 3 is seen from electronic control device 2 of printer 1, the ROM is assigned the top 128 kilobytes as shown on the right side of FIG. 5. That is, this cartridge 3 contains the program executed by CPU 510 of electronic control device 2, and when cartridge 3 is installed, CPU 510 of electronic control device 2 executes a jump instruction to go to a prescribed address in this ROM upon completion of initialization. Following this, CPU 510 operates according to the procedure stored in this ROM.

When CPU 510 accesses this 128-kilobyte space beginning from the top of the 2-megabyte space assigned to cartridge 3, ROM 618 is accessed by the address signal output via address buffer 617 provided in address bus CAB for the connector of cartridge 3, and the instructions and data stored in this ROM 618 are sent to CPU 510 in electronic control device 2 via data buffer 619 provided in data bus CDB for the connector. In FIG. 5, "X" indicates the value of the most significant 4 bits of the top address of the assigned space.

E. Explanation of Data Transfer Controller 603

In the address map shown in FIG. 5 and FIG. 6, addresses other than the addresses assigned to ROM and RAM contain the various control registers and status registers. Since these registers are realized by the data transfer controller 603, the data transfer controller will be explained next. The explanation will center around the circuitry, but the address maps (FIG. 5 and FIG. 6) are referred to as required.

Data transfer controller 603 shown in FIG. 7 is realized by means of the ASIC of the usable gate 7900. This ASIC is a standard cell, model No. SSC3630, produced by Seiko Epson Corporation, and it is a low-power element manufactured by a CMOS process. The data transfer controller 603 was designed using Seiko Epson's ASIC design system, LADSNET, which is a CAD system. This CAD system contains latches, flip-flops, counters, programmable logic arrays and other elements used in logic circuit design in the form of libraries, and after the required logic circuit is designed using these, the pattern of the ASIC can be automatically generated.

The data transfer controller 603 realized as an ASIC controls the exchange of data between CPU 510 of electronic control device 2 in the printer 1 and microprocessor 601 of cartridge 3 when cartridge 3 is installed in the connector CN11 of the printer 1. The exchange of data between these two is realized by means of the read control circuit 620 for sending data from electronic control device 2 to cartridge 3 via the read-only data bus, the FIFO control circuit 623, which performs the same function by passing data via the FIFO memory 621 using part of the configuration of the read control circuit 620, and the double-bank control circuit 624, which makes it possible to read data prepared by cartridge 3 from electronic control device 2. The FIFO memory 621 is a RAM that stores and reads data based on a first-in-first-out procedure, and in this embodiment, Mitsubishi Electric's M66252FP is used.

The address bus CAB is connected to the data transfer controller 603 via the address buffer 617 and the data bus CDB is connected to the data transfer controller 603 via the data buffer 619 as signal lines with electronic control device 2. Inside the data transfer controller 603 is a first decoder 631 that receives the signal of this address bus CAB and the cartridge select signal CSEL and outputs a selection signal to the respective parts inside the data transfer controller 603. In a similar manner, the address bus AAB and control signal CCC from microprocessor 601 are connected to the data transfer controller 603, and inside the data transfer controller 603 is a second decoder 632 that receives this address bus AAB and outputs a selection signal to each of the internal circuits. There is also a bus controller 635 that receives this address bus AAB and control signal CCC and outputs address signals and control signals to ROMs 606 to 609, RAMs 611 to 614 and the expansion RAM interface 615.

In addition to these, the data transfer controller 603 also contains various registers, a number of which are automatically written to when a specific process is performed in addition to those that are read from and written to by normal read-write operation. The configuration of these special registers is described below. In a relationship that treats cartridge 3 as a read-only device as seen from electronic control device 2, the registers writable from electronic control device 2 have a configuration whereby they are written by performing reading from a prescribed address. That is, by specifying a prescribed address, a selection signal is output from first decoder 631, and the data is written to the register by this signal. Reading from the register is performed by a normal read cycle. Further, the reading and writing of data by microprocessor 601 are performed by normal read-write operations. In FIG. 7, registers are shown connected to a readable bus and writing operation is indicated by only arrows. These registers include the interrupt request registers 640, the polling command registers 643, status registers (register STATUS in FIG. 5) 645, the transfer flag registers (register BPOLL in FIG. 6) 647, PROM control registers 649 and the control registers 650.

Except for status registers 645 and the transfer flag registers 647, all of these registers are generic names for multiple registers assigned as memory mapped I/O to CPU 510 of electronic control device 2 or microprocessor 601 of cartridge 3. The multiple registers are not necessarily assigned contiguous addresses. The interrupt request registers 640 include the registers AMDINT0, –1 and –2 and the registers AMDCLR0, –1 and –2 shown in FIG. 5 and FIG. 6. Polling command registers 643 include the register POLL and the register MCONTCS. The PROM control registers include the registers EEPCS, EEPSK and EEPDI.

Control registers 650 include those registers not belonging to read control circuit 620, FIFO control circuit 623 and double-bank control circuit 624 and are all those registers not mentioned in the above explanation. These are the registers ADDMUXA, ADDMUXB, CLKDIV, RTCVAL, RTCON, RTCSEL, RTCCLR and SYSKEEP shown in FIGS. 5 and 6.

Each of the 512-byte areas EWWRL and EWWRH shown in the memory maps in FIGS. 5 and 6 are used to write from electronic control device 2 to first and second latches 651 and 652 of read control circuit 620, and the register EWRD corresponds to these latches 651 and 652 seen as one word from microprocessor 601. Registers FIFOREQ, FIFORST and FIFOWR correspond to the FIFO register 653 of FIFO control circuit 623, and the registers FIRCLK, RDCLK, FIFORD and RDRST correspond to FIFO read register 655 of FIFO control circuit 623. FIFO control circuit 623 has a latch 657 that uses some of the functions of read control circuit 620 to retain the data to be written to FIFO memory 621.

The areas indicated by codes DPRAMA and DPRAMB in FIG. 5 are buffers with a 32-byte capacity, and they correspond to first and second buffers 658 and 659 of double-bank control circuit 624 as seen from electronic control device 2. Buffers 658, 659 as seen from microprocessor 601 are the banks DPWROA and DPWROB shown in FIG. 6. Prescribed bits d1 and d2 of status register 645 are used in the exchange of data via double-bank control circuit 624, (discussed in detail below).

F. Explanation of Registers

Interrupt request register 640 generates the request for an interrupt from electronic control device 2 to microprocessor 601 and retains it. Interrupts from electronic control device 2 to microprocessor 601 are prepared in three levels, and as shown in FIG. 5, they have three registers (AMDINT0, −1, −2). By reading one of these interrupt request registers 640 from electronic control device 2, an interrupt request for microprocessor 601 is generated. These registers are set by a read operation from electronic control device 2, but the data read has no meaning and is not related to the generation of an interrupt request.

Specific examples of configurations of these interrupt request registers 640 are shown in FIG. 8. These registers are configured from D-type flip-flops, and the output terminal Q of each of flip-flops 640a, -b and -c are set to active low by signals /AMDINT0, −1 and −2 output by first decoder 631 by the read operation of the above registers from electronic control device 2, resulting in the output of the interrupt signals /INT0, −1 and −2. The slash (/) affixed to the front of signal names indicates that that signal is low active (same below). The registers that clear the outputs of these flip-flops 640a, -b and -c are assigned, as shown in FIG. 6, to prescribed addresses as three read-only registers (AMD-CLR0, −1, −2). Therefore, when reading of each of the addresses assigned to these registers is performed by microprocessor 601, second decoder 632 outputs each of the signals /INTCLR0, −1 and −2, and the corresponding flip-flops are preset.

When an interrupt request is given from electronic control device 2, any of interrupt request registers 640 can be accessed, and microprocessor 601 judges the precedence and performs processing in response to the interrupt requests. In this case, microprocessor 601 clears the corresponding interrupt request registers 640a, -b and -c. Signals such as PUP2 that start with the code PUP are signals output from the reset signal output circuit 637 and become low level at the time of reset, etc. Signal PUP2 shown in FIG. 8 is used to clear three interrupt requests at once.

Polling command registers 643 are used to pass commands from microprocessor 601 to electronic control device 2, and these registers are writable by microprocessor 601 and readable by electronic control device 2. An example of a hardware configuration of these registers is shown in FIG. 9. As shown in the figure, polling command registers 643 can comprise two octal D-type flip-flops 643a and -b, which make up a 16-bit-wide data latch, and one D-type flip-flop 643c.

Data bus DB29 (16-bit-wide bus) from microprocessor 601 is connected to the data input terminals 1D to 8D of octal D-type flip-flops 643a and -b, and data bus DB68 (16-bit-wide bus) from electronic control device 2 is connected to the output terminals 1Q to 8Q. The signal /MCONTCS output from second decoder 632 at the time of access (register MCONTCS in FIG. 6) of polling command registers 643 by microprocessor 601 is connected to the clock terminal CK of the octal D-type flip-flops 643a and -b, and when this signal becomes active low, the contents of data bus DB29 of microprocessor 601 are latched in octal D-type flip-flops 643a and -b. Further, the signal /POLL output from first decoder 631 at the time of access (register POLL in FIG. 5) of polling command registers 643 by electronic control device 2 is connected to the output-enable terminal OE, which enables the output of the octal D-type flip-flops 643a and -b, and when this signal becomes low active, the data latched in the octal D-type flip-flops 643a and -b are output to data bus DB68 of electronic control device 2.

Signals /MCONTCS and /POLL are connected to clock terminal C and preset terminal PR of the D-type flip-flop 643c, and the signal CMDRD from the output terminal Q is set to high level when the octal D-type flip-flops 643a and -b latch data (signal /MCONTCS is low level) and to low level when this data is read by electronic control device 2 (signal /POLL is low level). Signal CMDRD output from D-type flip-flop 643c becomes the prescribed bit d3 (flag CMDRD below) of status registers 645, which are readable by electronic control device 2. Therefore, when electronic control device 2 reads status registers 645, electronic control device 2 can know that a command was set in polling command registers 643 from microprocessor 601.

When electronic control device 2 looks at flag CMDRD, which is bit d3 of status registers 645, and knows that a command has been sent, it reads the contents of polling command registers 643, i.e., command sent from microprocessor 601, in a normal read cycle. The command may be an instruction to begin transfer of the print data to data transfer controller 603, an instruction to begin printing or the display of a message in the console panel 518. When electronic control device 2 reads the contents of polling command registers 643, output signal CMDRD of D-type flip-flop 643c is inverted to high level by the signal /POLL as shown in FIG. 9. Therefore, microprocessor 601 can know whether the command it output was read by electronic control device 2 by monitoring the prescribed bit d2 of this transferred flag register 647.

In addition to the above-described information that indicates whether a command has been set from microprocessor 601, status registers 645 also hold the information shown in FIG. 10. A description of each bit is given below. Bit d0 is set to low level by the signal EWRDY generated in the read control circuit 620 when data is written to the read control circuit 620 from electronic control device 2, and when that data is read by microprocessor 601, bit d0 is set to high level by a signal from second decoder 632. This bit is called flag EWRDY.

Bits d1 and d2 indicate whether the double-bank control circuit 624 can be accessed from electronic control device 2 or microprocessor 601, and they're respectively referred to as flag ADDMUXA and flag ADDMUXB. These two bits correspond respectively to the two transfer banks built into the double-bank control circuit 624. These bits d1 and d2 are set and reset by microprocessor 601 writing data to bit d0 of the registers ADDMUXA and ADDMUXAB included in the control registers 650 as shown in FIG. 6. Therefore, by setting this flag to low level before microprocessor 601 writes data to one of the banks of the double-bank control circuit 624 and resetting it to high level upon completion of writing and having electronic control device 2 read data from the bank for which the flag is high level, data can be passed continuously from microprocessor 601 to electronic control device 2 by alternately writing data to and reading data from these two banks.

Bit d3 (flag CMDRD) has already been described. Bit d5 is flag CLKDIV, which is set based on the operation clock of microprocessor 601. The operation clock of microprocessor 601 is the clock CLK output from the first oscillating circuit 663, which uses an externally attached liquid crystal vibrator 661, and when microprocessor 601 writes level 0 to the prescribed bit d0 of the register CLKDIV of the control register 650, the operation CLK of microprocessor 601 becomes 25 MHz, and when level 1 is written to bit d0, then the operation clock becomes 12.5 MHz. The flag CLKDIV of the status registers 645 as seen from electronic control device 2 is set to low level when this clock CLK is 25 MHz and to high level when it is 12.5 MHz. When it is necessary for electronic control device 2 to know the frequency of the operating clock, i.e., operating speed, of microprocessor 601 in order to match timing for data transfer, etc., it checks this bit of the status registers 645.

Bit d6 is the flag ADMON, which is set to high level when microprocessor 601 is operating and to low level when it enters the sleep mode. In this embodiment, microprocessor 601 performs processing that receives the page description language from electronic control device 2 and develops it into image data, and therefore when a prescribed amount of time has elapsed during which no page description language to be processed is sent from electronic control device 2, microprocessor 601 reduces its initial operating frequency by one half to 12.5 MHz in order to reduce power consumption, and after more time has elapsed, it stops its own operation and enters the so-called "sleep mode." At this time, microprocessor 601 writes level 0 to register ADMON of the control registers 650. As a result, this bit d6 of the status registers 645 becomes low level as seen from electronic control device 2, and by checking this bit, electronic control device 2 can know the operating mode of microprocessor 601.

This time is measured with a real-time clock built into the data transfer controller 603. The clock RCLK for this real-time clock is a clock from the second oscillating circuit 667 configured using an externally attached liquid crystal vibrator 665. The real-time clock is disposed inside the bus controller 635, and it receives instructions from microprocessor 601 to measure the elapse of prescribed time periods. The reason why two sets of liquid crystal vibrators and oscillators are employed is to make it possible to change the operating clock CLK of microprocessor 601 independently of the operating clock RCLK of the real-time clock.

The real-time clock sets the d1 bit of registers RTCVAL and RTCSEL, which belong to the control registers 650, to low or high, and it is capable of specifying four interval timers, which it can start by writing level 1 to the prescribed bit d0 of the register RTCON. A timer that has been started outputs an interrupt request signal to microprocessor 601 at prescribed intervals until level 0 is written to bit d0 of register RTCON and it is stopped. When microprocessor 601 receives this interrupt request signal, it reads register RTCCLR and clears the interrupt request. The outputs of these interval timers are used for counting user time, etc., in the processing of the page description language.

Next is an explanation of the configuration of PROM control registers 649. PROM control registers 649 include the registers EEPCS, EEPSK and EEPDI shown in FIG. 6, but these registers are memory built into cartridge 3 and are used to exchange data with EEPROM 670, which is capable of electrical erasure and rewriting of data.

Cartridge 3 of this embodiment stores the various variables (configuration) required for operation of the laser printer 1 in EEPROM 670. This EEPROM 670 is one that reads, erases and writes data by serial transfer, and in this embodiment National Semiconductor's NMC93C66X3 is used. This EEPROM 670 has a storage capacity of 16 bits×256 bytes (number of registers) and is capable of reading, erasing or writing the contents of any specified register. When EEPROM 670 is set to a select condition by the chip select signal CS, the "0" and "1" data sent to the serial data input terminal Din are received in sync with the serial data clock SL, but the first three transferred bits of the data is interpreted as a command to the EEPROM, and the next 8 bits are interpreted as the register number where the data is to be read, erased or written. In the case of writing data, the data to be stored are supplied to the data input terminal Din in sync with the serial data clock SL following these command and register specifications.

Register EEPCS switches the chip select signal, and when microprocessor 601 writes level 1 to bit d0 of this register, EEPROM 670 goes to a select condition. Register EEPSK generates the serial data clock SK, and when microprocessor 601 alternately writes level 0 and level 1 to this register, it generates the serial data clock for EEPROM 670. Register EEPDI holds the 1-bit data to be written to EEPROM 670, and microprocessor 601 rewrites the register EEPSK and rewrites the prescribed bit d0 of register EEPDI in sync with the generation of the serial data clock SK according to the data to be written. The data output terminal Dout of EEPROM 670 is the prescribed bit d0 of the transfer flag register 647 explained above, and if microprocessor 601 reads bit d0 of transfer flag register 647 in sync with the serial data clock SK after it outputs the data read command and the number of the register to be read to EEPROM 670, then it can read the contents of the specified register. Since the data stored in EEPROM 670 is retained even after the power is turned off, the contents of EEPROM 670 can be read immediately after laser printer 1 is powered on again, thus making it possible to return laser printer 1 to the various settings, so-called configuration, to the condition they were in immediately before powering off.

EEPROM 513 is an electrically erasable programmable ROM, in which data can be erased, written and read in one-byte units. Therefore, when CPU 510 rewrites data, it specifies an address, erases one byte, and writes the new data on top of that. The data stored in this EEPROM 670 are retained even if the power is turned off, and therefore after the power is turned on, the laser printer 1 can be returned to its various settings, i.e., so-called configuration, that existed before the power was turned off by reading the contents of EEPROM 670.

Some examples of the principal types of information stored in EEPROM 670 are given below. Information other than this can also be stored depending on the use.

(A) Items regarding the receiving of data by the laser printer 1 from the external workstation 7, etc.
  Interface specifications
    RS232C, RS422, specific LAN, parallel
  Specifications for serial communication
    Full/half duplex, baud rate,i stop bit, parity, data length, etc.
(B) Items regarding printing
  Number of copies
  Selection of printing paper
    Upper/Lower, Manual insertion
  Printing of start page
    Yes, No
(C) Items regarding error modes
  Print error description
    Yes, No
  Handling of paper jams
    Store or do not store image data of page on which paper jam occurred.
(D) Items regarding software utilization
  Name of printer (for identifying printers on LAN)
  Passwords
  Cache specification
  Various types of timers This data is stored in EEPROM 670, and CPU 510 reads what it requires from among this data and uses it as settings for communications with workstation 7, to control laser engine 5, etc. These settings include those set by console panel I/F 519 and those set according to information sent from workstation 7. This is described in greater detail below.

G. Configuration and Operation of Read Control Circuit 620

Next, an example configuration of read control circuit 620 and a data transfer procedure using read control circuit 620 are explained. Read control circuit 620 comprises two 8-bit first and second latches 651, 652 in addition to, as shown in FIG. 11, a ROM 671 that outputs the data required for transfer, a three-input AND gate 672, and a D-type flip-flop 674 that generates the flag EWRDY (bit d0) for status registers 645. When read control circuit 620 is viewed from electronic control device 2, these latches correspond to the two registers EWWRL and EWWRH, which transfer data in 8-bit units as shown in FIG. 5. These registers are used to transfer the lower byte and upper byte, respectively, of the 16-bits/word data. First and second latches 651, 652 correspond to the register EWRD shown in FIG. 6 when viewed from microprocessor 601. That is, microprocessor 601 can read both latches 651, 652 as one word via data bus DB290.

ROM 671 of read control circuit 620 stores 256 bytes of data; e.g., it can be realized with a fuse ROM, a low-capacity PROM, etc. Of course, it may also be realized using part of a large-capacity ROM, and the same function can be achieved when RAM is used by transferring the data in advance. The lower 8 bits (AC1 to AC8) of the address line from the connector address bus CAB are connected to the address terminals A0 to A7 of ROM 671, and the data terminals O0 to O7 are connected to the inputs 1D to 8D of first latch 651 and second latch 652. The outputs of ROM 671 are also output to FIFO control circuit 623 as the data bus Z0 to Z7 for FIFO control circuit 623.

The outputs of first latch 651 and second latch 652 are connected to data bus DB29, and these can be read by microprocessor 601 as the register EWRD. The output signal /EWROM of three-input AND gate 672 is input to chip select CE and output-enable OE of ROM 671, and when any one of the signals /EWWRH, /FIFOWR and /EWWRL input to three-input AND gate 672 becomes low active, this signal becomes active, at which time ROM 671 outputs the data at the address specified by the lower 8 bits of the connector address bus CAB.

Signal /EWWRH becomes low level when transfer of the upper byte is specified by read control circuit 620, the signal /EWWRL becomes low level when transfer of the lower byte is specified by same, and the signal /FIFOWR becomes low level when data transfer is specified by FIFO control circuit 623. Since the signal /EWWRL and the signal /EWWRH are input to the clock terminals CK of first latch 651 and second latch 652, respectively, when these signals become active and data is output from ROM 671, this data is held in first latch 651 and second latch 652. Moreover, since the signal /EWWRL is input to the clock terminal C of the D-type flip-flop 674, the output Q of D-type flip-flop 674 is inverted to low level when the lower byte is transferred. The output EWRDY is handled as bit d0 of status registers 645 and bit d1 of transfer flag registers 647, i.e., flag EWRDY.

First latch 651 and second latch 652 are handled as register EWRD by microprocessor 601, and therefore when microprocessor 601 goes to read the data held by first latch 651 and second latch 652, it performs a read operation on register EWRD. At this time, signal EWRD becomes low active, and this signal outputs the previously held data to the output side of first latch 651 and second latch 652, i.e., to data bus DB29, connected to the output-enable terminal. Signal /EWRD is connected to the preset terminal PR of D-type flip-flop 674, and therefore signal EWRDY, which is the Q output of D-type flip-flop 674, is inverted to high level at the same time microprocessor 601 reads the data of first latch 651 and second latch 652. That is, flag EWRDY, which is bit d0 of status registers 645 and bit d1 of transfer flag registers 647, is set to level 1.

Assuming this hardware, electronic control device 2 and microprocessor 601 transfer data from electronic control device 2 to microprocessor 601 according to the following procedure. The data to be transferred from electronic control device 2 to microprocessor 601 is print data electronic control device 2 has received from the workstation 7 and is the page description language program to be processed in microprocessor 601 of cartridge 3. Data transfer by read control circuit 620 is performed by the routine for handling data transfer to cartridge 3 executed by CPU 510 (FIG. 12) and by the data read interrupt handler routine executed by microprocessor 601 (FIG. 14).

When the print data to be transferred to cartridge 3 are complete, CPU 510 initiates the processing shown in the flowchart in FIG. 12, whereby it first reads the flag EWRDY (bit d0) of status registers 645 (step S700). Flag EWRDY becomes level 0 when data is set in first latch 651 and second latch 652 of read control circuit 620, and when this data is read by microprocessor 601, the flag is set to level 1, after which flag EWRDY is judged whether it has been set to level 1 (step S705).

CPU 510 stands by until flag EWRDY becomes level 1, and when it becomes level 1, CPU 510 performs processing that reads the addresses corresponding to [top address of area EWWRH+data D×2 to be transferred]. When reading of the area EWWRH is performed, the data is output from ROM 671. As shown in FIG. 13, the 256 data at the even-numbered addresses from 00h to FFh from the top address EWWRH are written in order to ROM 671. The reason why data is not positioned at odd-numbered addresses is basically because data access by CPU 510 is performed in single words (16 bits) and because word units cannot be accessed beginning from odd-numbered addresses (results in address bus error). When an address separated from the top of the area EWWRH by D×2 is read, the data D from ROM 671 are read and latched in second latch 652 as shown in FIG. 11.

When transfer (second latch 652 holds data) of the upper byte of the data to be transferred is performed in this manner, CPU 510 performs transfer of the lower byte (first latch 652 holds data) in the same manner (step S715). Assuming one word of data is being held by first and second latches 651, 652 as a result of the above processing, CPU 510 performs processing that sets one interrupt request register (AMDINTO in this embodiment) (step S720).

CPU 510 then repeatedly executes the transfer handler routine shown in FIG. 12, but when data is held by the first latch 651, the flag EWRDY is set to low level as shown in FIG. 11, and therefore the next data transfer is not processed until this flag EWRDY becomes high level (level 1) (steps S700, S705).

When CPU 510 sets the interrupt request register (AMDINTO), microprocessor 601 receives this interrupt request and initiates the data read interrupt handler routine shown in FIG. 14. This processing is initiated immediately after data is held in first and second latches 651, 652 in read control circuit 620, and microprocessor 601 reads the one word of data prepared by electronic control device 2 by reading register EWRD (step S730). Next, microprocessor 601 transfers the data it just read to a prescribed area in RAMs 611 to 614 (step S735).

By means of the processing described above, electronic control device 2 is capable of transferring data to cartridge 3, which is connected by no more than the data bus CDB, which is a read-only line. Moreover, since data is written in byte units and are read in word units, microprocessor 601 takes in data with great efficiency. This explanation covers the transfer of one word of data, but data do not have to be transferred in word units and can be transferred in byte units. In that case, only transfer that uses the area EWWRL is performed and the upper eight bits of data can be discarded by microprocessor 601.

H. Configuration and Operation of FIFO Control Circuit 623

FIFO control circuit 623 is equipped with latch 657 that latches the data to be written to FIFO memory 621, FIFO write registers 653 that control the writing of data to FIFO memory 621, FIFO write circuit 654 that actually outputs the control signal to FIFO memory 621 by writing data to FIFO write registers 653, and FIFO read registers 655 that control the reading of data from FIFO memory 621. FIFO memory 621 can hold 1024 bytes of data and is equipped internally with an address counter for writing and a counter for reading. FIFO memory 621 also has, as shown in FIG. 15, a write reset terminal /WRT, a read reset terminal /RRT, a control signal terminal /WR for writing, a control terminal RD for reading, an 8-bit data bus D7-D0 on the write side, an 8-bit data bus Q7-Q0 on the read side, a clock terminal /WCK for writing and a clock terminal /RCK for reading.

Below is a detailed explanation of the configuration of the FIFO control circuit 623. As shown in FIG. 15, the outputs Z0 to Z7 of ROM 671 in read control circuit 620 are connected to the data input terminals 1D to 8D of latch 657, and the data output terminals 1Q to 8Q of this latch 657 are connected to the data bus D0 to D7 of FIFO memory 621. Output signal /FIFOWR from FIFO write register 653 is connected to the latch control terminal CLK of latch 657, and when this output signal /FIFOWR becomes low level, the outputs Z0 to Z7 of the ROM 671 are enabled (see FIG. 11), and when the signal /FIFOWR rises, the outputs Z0 to Z7 of the ROM 671 are held in the latch 657 and become the write data FIFODATA.

Signals /FIFOREQ, /FIFORST and the 5-MHz clock CLK5M from FIFO write register 653 are connected to the input terminals of FIFO write circuit 654. Write reset signal /WRT, write clock /WCL and write control signal /WR for the FIFO memory 621, which are outputs of this FIFO write circuit 654, are connected to the reset terminal /WRT on the write side, the clock terminal /WCK for writing and the control signal terminal /WR for writing, respectively, of FIFO memory 621. Further, the write response signal /ACK, which is another output of FIFO write circuit 654, takes on a logical sum with another response signal and is output to electronic control device 2 from the connector CN11 as the signal /ODTACK.

Signals /RDRST, /FIFORD and the read clock RDCLK from FIFO read register 655 are connected directly to the reset terminal /RRT on the read side, the control signal terminal /RD for reading and the clock terminal /RCK for reading, respectively, of FIFO memory 621.

An example configuration of that part of FIFO write circuit 654 which generates write control signal /WR, the write clock /WCK and the write response signal /ACK is shown in FIG. 16. FIFO write circuit 654 comprises, as shown in the figure, D-type flip-flop 677a, which receives the signal /FIFOREQ as data and the clock CLK5M as a clock, counter 677b, which counts up according to the signal resulting from inverting the clock CLK5M in inverter 677d, D-type flip-flop 677c, which operates using the signal resulting from inverting the least significant output (divided-by-two output) QA of this counter 677b in inverter 677f as a clock, and two-input OR gate 677, which sets the operation of counter 677b.

The negative output Qn of the D-type flip-flop 677a is input to the clear terminal CLR of the D-type flip-flop 677c and the two-input AND gate 677g. The data terminal D of the D-type flip-flop 677c is pulled up via a resistor, and the negative output Qn is output as the write response signal /ACK. Further, the divided-by-four output QB of the counter 667b is input to two-input OR gate 677g, and the output of this two-input OR gate 677g is input to the clear terminal CLR of counter 677b.

The operation of this circuit is shown in the timing chart in FIG. 17. The clock CLK5M functions as a sync signal for the operation of the circuit. When the signal /FIFOREQ becomes active low (timing ta), the positive output Qp of the D-type flip-flop waits for the clock CLK5M and inverts to low level and the write control signal /WR becomes active low (timing t1). At this time, since the negative output Qn of the D-type flip-flop 677a is inverted to high level and the output of the two-input OR gate 677g also becomes high level, the counter 677b, to whose clear terminal CLR this is input, is set to a count-enabled condition. The counter 677b counts up every time the clock CLK5M rises (timing t2, t3, t4, t5), and the write clock /WCK generated by inverting the divided-bytwo output Qa in the inverter 677f changes from low to high, to low, to high. When the signal /FIFOREQ inverts to high level during this time (timing tb), the write control signal /WR inverts to high level with the next rise of the clock CLK (timing t4). One input of two-input OR gate 677g is reset to high level at this time, but while the divided-by-four output QB is maintained at high level, the counter 677b continues counting.

When counter 677b has counted the fourth rise in the clock CLK5M (timing t5), the divided-by-four output is inverted to low level and the output of the two-input OR gate 677g also inverts to low level. As a result, the counted value in the counter 677b is cleared and the counter 677b stops counting and returns to its initial condition. While the counter 677b is counting, the write clock /WCK, which is the divided-by-two output QA inverted, changes as shown in FIG. 17. The D-type flip-flop 677c goes to an operate-enabled condition when the negative output Qn of the D-type flip-flop 677a inverts to high level, and when the output of the inverter 677f rises, the condition (high level in this case) of the data terminal D is set and the negative output Qn immediately inverts the write response signal /ACK to low level (timing t3). The D-type flip-flop 677c is reset when its clear terminal CLR becomes low level, and therefore the write response signal /ACK falls with the rise of the write clock /WCK and rises with the fall of the write clock /WCK (FIG. 17, timing t3-t4).

FIFO memory 621 is set to the write mode by the first write clock /WCK when the control terminal /WR on the write side is held at low level (timing t2-t3), and the write data FIFODATA output to the data bus D0 to D7 on the write side at that time is written to the internal memory in sync with the rise of the next write clock /WCK (timing t5) and the address counter for writing is incremented by 1. Further, as shown in FIG. 18, when the reset terminal /WRT on the write side of the FIFO memory 621 is held at low level (timing u1 to u6) and the write clock /WCK is made low active (timing u2 to u5) one or more times (two times in this embodiment), the address counter on the write side is reset to its initial value. In this embodiment, the write clock /WCK is output one more time after this (timing u6 to u7), but this is to set the FIFO memory 621 to the write mode.

The circuitry that generates each of the signals shown in FIG. 16 is not shown, but it can be easily configured by combining logic circuits as in the circuit shown in FIG. 16.

By utilizing this FIFO memory 621, CPU 510 in electronic control device 2 can use the FIFO control circuit 623 to transfer data to microprocessor 601. Data transfer using the read control circuit 620 is performed on a byte or word unit basis, whereby each time one byte or one word of data is transferred, an interrupt request signal is output to microprocessor 601 to notify it of the transfer, while data transfer using the FIFO control circuit 623 utilizes the function of the FIFO memory 621 to combine multiple bytes for transfer. In order to transfer data from electronic control device 2 to microprocessor 601, CPU 510 of electronic control device 2 executes the transfer handler routine shown in FIG. 19 and microprocessor 601 of cartridge 3 executes the handler routine shown in FIG. 20. First is an explanation of the handler routine shown in the flowchart in FIG. 19.

When CPU 510 of electronic control device 2 performs data transfer using the FIFO control circuit 623, it first prepares the prescribed number of bytes of data to be transferred.

When CPU 510 of electronic control device 2 initiates the data transfer handler routine shown in FIG. 19, first the register FIFORST belonging to the FIFO write registers 653 of the FIFO control circuit 623 is read and the address counter on the write side is reset (step S750). When the register FIFORST is read, the signal /FIFORST becomes low active, and the address counter in the FIFO memory 621 is reset according to the timing shown in FIG. 18. Following this, the variable N is reset to 0 to count the number of data sent out (step S755). Next, the address [top address of register FIFOWR+data D×2 to be transferred] is read. When this address is read, the signal /FIFOWR is output and, as explained for the read control circuit 620, the prescribed address in ROM is accessed (see FIG. 13), the data D CPU 510 is transferring are output from ROM 671, and this data is latched in the latch 657 via the bus Z0 to Z7 shown in FIG. 11.

Next, the data D read from register FIFOREQ of the FIFO control circuit 623 and held in latch 657 are transferred to the FIFO memory 621 (step S765). When register FIFOREQ is read, the signal /FIFOREQ becomes low active, and as explained using FIG. 15 to FIG. 17, the write control terminal /WR of the FIFO memory 621 is made low level and the write clock /WCK is output to the clock terminal /WCK on the write side. As a result, the data D held in latch 657 are written to the address indicated by the address counter on the write side of the FIFO memory 621. At the same time, the contents of the address counter on the write side inside the FIFO memory 621 are incremented by 1. When one byte of data is written in this manner, the variable N, which indicates the number of data transferred, is incremented by 1 (step S770) and judgment is performed to determine whether or not the variable N equals the total number of bytes X to be transferred (step S775). Therefore, the processing in steps S760 to S775 above is repeated until the number of bytes of data transferred N equals the total number of bytes X.

When all data have been transferred, CPU 510 sets one of the interrupt request registers (AMDINT1) to notify microprocessor 601 that the transfer of data is complete (step S780), after which the routine escapes to NEXT and is terminated.

Microprocessor 601, on the other hand, initiates the data receive interrupt routine shown in the flowchart in FIG. 21 when it receives this interrupt request AMDINT1. When this routine is initiated, microprocessor 601 first accesses the register RDRST and the register FIFORD belonging to the FIFO read registers 655 of the FIFO control circuit 623 and resets the address counter on the read side of the FIFO memory 621 (step S800) in the same way it resets the address counter on the write side. Since microprocessor 601 performs resetting of the address counter on the read side, etc., extremely fast, no special hardware configuration is required, and microprocessor 601 can realize the whole transfer with software by just accessing each register at a prescribed timing. The same is true for reading data from the FIFO memory 621. Next, the variable M for counting the number of received data is reset to 0 (step S805).

Following this, the register FIRCLK belonging to the FIFO read registers 655 is read (step S810), and the read data is transferred to a prescribed area in RAMs 611 to 614 (step S815). When the register FIRCLK is read, a read clock is output to the clock terminal on the read side of the FIFO memory 621, and the data D at the address indicated by the read address counter at that time are read out. At the same time, the contents of the address counter on the read side in the FIFO memory 621 are incremented by 1.

When one byte of data is received, the variable M is incremented by 1 (step S820), and this variable M is judged whether or not it is equal to the total byte number X (step S825). Therefore, the processing in steps S810 to S825 above is repeated until the byte number M of the received data equals the total byte number X for the data.

When it is judged that all data have been received, the microprocessor 610 writes a command to the polling command registers 643 that indicates the completion of the writing of data (step S830). CPU 510 of electronic control device 2 knows that data reception by the FIFO control circuit 623 is complete by reading the contents of the polling command registers 643. The next transmission can now be started. Microprocessor 601 then escapes to RTN and terminates this routine.

By means of the processing described above, large amounts of data can be efficiently transferred utilizing the FIFO control circuit 623. The transferred data is stored in a prescribed area in RAMs 611 to 614 of the data transfer controller 603 and wait for processing by microprocessor 601.

In the FIFO control circuit 623 shown in FIG. 15, the holding of data in the latch 657 is performed by the signal /FIFOWR, and reading of the register FIFOREQ, which belongs to the FIFO write registers 653, i.e., the signal /FIFOREQ, is used to write the data held in the latch 657 to the FIFO memory 621. In contrast to this, since the holding of data in the latch 657 and the writing of data to the FIFO memory 621 can be performed by a regular series of processes, a configuration is possible in which, as shown in FIG. 21, a delay element 678 is provided in the line for the signal /FIFOWR, and after the holding data in the latch 657 by the signal /FIFOWR has been completed, a signal equivalent to the signal /FIFOREQ is output to the FIFO write circuit 654 at a prescribed timing. In this case, it is not necessary to read register FIFOREQ to write data to the FIFO memory 621, i.e., step S765 in FIG. 19 is not required, thus making it possible to write data in one processing cycle. As a result, processing can be simplified and data can be transferred faster. A circuit using simple one-shot multivibrators, a circuit that delays the prescribed number of clock cycles through a series of D-type flip-flops or other circuit may be used as the delay element 678.

I. Configuration and Operation of Double-Bank Control Circuit 624

The image data obtained upon completion of image development are then transferred to electronic control device 2, where they are stored in RAM 512 and printed by the laser engine 5 according to a prescribed timing. This image data is transferred by the double-bank control circuit 624. The double-bank control circuit 624 transfers from microprocessor 601 to electronic control device 2 and is equipped with two banks that store 32 bytes (16 words) of data. These are referred to as A bank and B bank, and since the hardware of both is exactly the same, only the configuration of A bank is shown in FIG. 22.

The address and data buses of each of these banks are configured such that they can be switched from microprocessor 601 and from electronic control device 2, and as shown in the figure, they are configured from the data selectors 681 and 682, which select the address line, the four octal line buffers 684 to 687, which are used in two sets of two each and select the data bus (16 bits wide), the RAMs 691 and 692, which have a 32-byte storage capacity, the OR gates 694 and 695, which make up the other gates, and the inverter 696. In FIG. 22, a configuration is shown in which two memory chips with a 32-byte storage capacity are used, but the memory can also be realized by switching the upper address of a single memory chip.

The data selector 68 is configured such that it selects the least significant four bits (AC1 to AC4) of the address bus CAB on electronic control device 2 side and the lower four bits (A2 to A5) of the address bus AAB on microprocessor 601 side and outputs them, and selection of the address bus is performed by the signal ADDMUXA (bit d0 of register ADDMUXA) connected to the select terminal S. The data selector 682 switches the read-write signal for the RAMs 691 and 692 in addition to selecting the address bus, and in a similar manner, the signal ADDMUXA connected to the select terminal S determines which signals are connected to the chip select terminals CE1 and −2 and the output-enable terminal OE of the RAMs 691 and 692 by switching them.

The octal line buffers 684 and 685 are tristate line buffers connected to the data bus DB29, and when the gate terminals 1G and 2G become low level, the data bus DB29 on microprocessor 601 side and the data bus of the RAMs 691 and 692 are connected, resulting in a condition that allows writing of data from microprocessor 601 to RAMs 691 and 692. The output of the OR gate 694, whose inputs are the signal /DPWROA and the signal /ADDMUXA, is connected to the gate terminals 1G and 2G of the octal line buffers 684 and 685. The signal /DPWROA becomes low level when microprocessor 601 writes data to A bank. Therefore, by setting bit d0 of register ADDMUXA to low level in advance of writing data to A bank, when microprocessor 601 does write data to A bank, the gates of the octal line buffers 684 and 685 open and the data output to the data bus DB29 are output to the data bus of RAMs 691 and 692, where they are written.

When the gate terminals 1G and 2G of the octal line buffers 686 and 687 become low level, the data bus DB68 on electronic control device 2 side and the data bus of the RAMs 691 and 692 are connected, resulting in a condition in which data can be read out from RAMs 691 and 692 to electronic control device 2. The output of the OR gate 695, whose inputs are the signal /DPOE1A and the signal ADDMUXA inverted in the inverter 696, is connected to the gate terminals 1G and 2G of the octal line buffers 686 and 687. The signal /DPOE1A becomes low level when the data of A bank is read from electronic control device 2 side. Therefore, by setting bit d0 of register ADDMUXA to high level in advance of reading the data of A bank, the gates of the octal line buffers 686 and 687 open and the data output to the data bus of RAMs 691 and 692 are output to the data bus DB68 when electronic control device 2 performs a read operation on A bank.

The transfer processing of image data by microprocessor 601 and its receiving processing by CPU 510 of electronic control device 2 are explained below assuming this hardware. FIG. 23 is a flowchart showing the transfer start handler routine for image data executed by microprocessor 601. As shown in the figure, microprocessor 601 sets a transfer start command in the polling command registers 643 before transferring image data (step S850).

CPU 510 of electronic control device 2 reads this polling command register 643 and executes the response handler routine shown in FIG. 24. That is, electronic control device 2 judges whether or not the laser printer 1 is in a print-enabled condition (step S860), and if it judges that it is in a condition that will allow printing, then it sets one (AMDINT2) of the interrupt request registers (step S865) and escapes to NEXT and temporarily terminates the routine. If the printer is not in a condition that will allow printing, then CPU 510 performs processing that notifies microprocessor 601 of cartridge 3 (step S870). A condition that will not allow printing is one in which the laser engine 5 has not completely warmed up yet, or there is a paper jam or other condition that will not allow printing even though the image data have been received.

When the interrupt request signal AMDINT2 is received from electronic control device 2, microprocessor 601 initiates the image data transfer interrupt handler routine shown in FIG. 25. When this processing is activated, microprocessor 601 first writes level 1 to bit d0 of register ADDMUXA (step S900). When bit d0 of register ADDMUXA is level 1, the data bus of RAMs 691 and 692 is connected to the data bus DB29 on microprocessor 601 side as was explained using FIG. 22, thus disabling access from electronic control device 2.

Next microprocessor 601 transfers 16 words (32 bytes) of data to A bank DPWROA (step S902). When data is written to A bank DPWROA, the signal /DPWROA shown in FIG. 22 becomes low level, and the data is written to RAMs 691 and 692 via the octal line buffers 684 and 685. Upon completion of transfer of the 16 words of data, microprocessor 601 writes level 1 to bit d0 of register ADDMUXA (step S904), and the data bus of RAMs 691 and 692, which make up A bank, is connected to the data bus DB68 of electronic control device 2.

Microprocessor 601 then writes the command data that notifies that transfer to A bank is complete to the polling command registers 643 (step S906). This completes transfer of data to A bank, and microprocessor 601 then executes the same processing as above with respect to B bank (step S910). When data transfer to B bank is complete, microprocessor 601 writes command data that notifies that transfer is complete in the same way to the polling command registers 643. In this way, the transfer of a total of 32 words (64 bytes) of data to A and B banks from cartridge 3 is completed.

In response to the above processing performed by microprocessor 601, CPU 510 of electronic control device 2 executes the image data receive handler routine shown in FIG. 26. That is, CPU 510 first reads bit d3 of the status registers 645, i.e., flag CMDRD, (step S920) and judges whether or not it is at level 0 (step S925). When command data is written to the polling command registers 643 by microprocessor 601, the flag CMDRD is set to level 0, and therefore CPU 510 reads the command data in the polling command registers 643 (step S930).

CPU 510 checks the command data just read and judges if it is command data that indicates that data transfer to A bank is complete (step S935), and if it is not, then CPU 510 executes other processing (step S940). When the command data in the polling command registers 643 indicate that data transfer to A bank is complete, electronic control device 2 reads the 16 words in A bank DPRAMA (step S945; see FIG. 5) and transfers the read data to RAM 512 (step S950).

Since the above processing completes the reading of the 16 words of data in A bank, electronic control device 2 sets one interrupt request register (AMDINT2) that will allow transfer of the next 16 words from microprocessor 601. The processing in steps S920 to S955 is then repeated with respect to B bank. That is, when it is judged that the transfer of data by microprocessor 601 from B bank has been completed based on the command data in the polling command registers 643, then one interrupt request register is set to send an interrupt request to microprocessor 601 after the 16 words of data in B bank DPRAMB are read and transferred to RAM 512.

When it receives the interrupt request, microprocessor 601 executes the interrupt handler routine shown in FIG. 26 again, and therefore microprocessor 601 and CPU 510 complete the transfer of all image data by executing both routines (FIG. 25 and FIG. 26). If new print data is not received from electronic control device 501 after all image data have been transferred, then microprocessor 601 writes level 1 to register CLKDIV of the control registers 650 after a prescribed time period has elapsed and switches its own operating frequency to half, i.e., to 12.5 MHz, to reduce power consumption and reduce the amount of heat generated.

J. Printing of Image Data

Electronic control device 2, which receives the transfer of all image data, prints the image data by exchanging signals with the laser engine 5 using the double-buffer circuit 520 and register 517 explained above. The exchange of signals between electronic control device 2 and laser engine 5 is roughly depicted in FIG. 27. Printing is summarized below referring to this figure.

When the image data that have been developed are received from cartridge 3, electronic control device 2 inquires whether or not the laser engine 5 is in a print-enabled condition, and if it does judge that warming up, etc., are complete and the laser engine is in a print-enabled condition, then it outputs the print signals shown in FIG. 27 to the laser engine 5 via the register 517. When the laser engine 5 receives these signals, it immediately starts the motor for paper transport. Rotation of the photosensitive drum, charging processing, etc., are started in sync with this.

When the paper to be printed on reaches a position at a prescribed distance from the photosensitive drum, the laser engine 5 detects the end of the paper and outputs the signal VREQ to electronic control device 2 via the register 517. When electronic control device 2 receives this signal VREQ, it waits a prescribed period of time; i.e., the time required for the photosensitive drum to rotate to the position where formation of the latent image by the laser beam begins, and outputs the signal VSYNC via the register 517. When the laser engine 5 receives this signal VSYNC, it outputs the laser beam horizontal sync signal HSYNC via the register 517. Since this signal HSYNC is equivalent to a signal that instructs to begin reading one line of image data, the laser engine 5 reads image data from either RAM 520A or RAM 520B of the double-buffer circuit 520 in sync with this signal. When there is a top margin, control is performed that ignores the signal VSYNC for the number of lines corresponding to the top margin. This control is the same when a bottom margin is formed.

At the same time, CPU 510 counts this signal and transfers the necessary image data to RAM 520A or RAM 520B of the double-buffer circuit 520. When a prescribed amount of time has elapsed or the count of the horizontal sync signal becomes equal to a value previously set to conform with the paper size after the laser engine 5 detects the trailing edge of the paper, CPU 510 terminates the transfer of image data to the double-buffer circuit 520. By means of the above processing, one page of image data is transferred to the laser engine 5 and the image is printed on the paper.

K. General Processing and Changing of Settings

The configuration and operation of each section were explained above in detail. Next is an explanation, using FIG. 28 and FIG. 29, of the overall printing processing executed by electronic control device 2 and cartridge 3. FIG. 28 is a flowchart showing the main handler routine executed in the laser printer 1, i.e., electronic control device 2, and FIG. 29 is a flowchart showing the main handler routine of cartridge 3.

When the power is turned on, electronic control device 2 performs processing that checks the contents of ROM 511 or the function of RAM 512 (step S1000). ROM 511 is checked by seeking the checksum of the data and comparing it with a value provided in ROM 511 in advance, and RAM 512 is checked by reading prescribed data that has been written and confirming it. In addition to ROM 511 and RAM 512, console panel I/F 519, etc., can also be checked.

When the power is turned on, microprocessor 601 of cartridge 3 performs initialization before the prescribed processing is executed. That is, as shown in FIG. 29, the microprocessor also checks ROMs 606–609 and RAMs 611–614 (step S1100), after which it performs processing that reads out the settings stored in EEPROM 670 and develops them in a prescribed area in RAM 611 (step S1110). The settings read from EEPROM 670 can be communication parameters, the number of copies to be printed or other settings made up to the previous session.

CPU 510 of electronic control device 2 reads these settings that microprocessor 601 has read from EEPROM 670 and developed in RAM 611 from cartridge 3 and stores them in RAM 512 in electronic control device 2 (step S1010, FIG. 28). The reading of data from cartridge 3 by electronic control device 501 is performed using double-bank control circuit 624 described above. Electronic control device 501 which has read these settings uses the settings for data input port 514, etc. Once the above initialization processing has been completed, electronic control device 501 waits for data to be sent from workstation 7.

When print data is sent from workstation 7, electronic control device 2 receives them via the data input port 514 (step S1020). Since the settings for data transfer have already been made at this time, electronic control device 2 receives the data with no problem. Next, electronic control device 2 performs processing that sends this print data to cartridge 3 utilizing the FIFO control circuit 623 (step S1030). The configuration for transferring large amounts of data utilizing the FIFO control circuit 623 has already been described.

When print data is received in cartridge 3 via FIFO control circuit 623 (step S1120, FIG. 29), processing is performed that develops the image data using this data. The developed image data is stored as a bit image in a prescribed area in RAMs 611 to 614, which were described above. Once everything has been prepared in electronic control device 2, the developed data is immediately transferred to electronic control device 2 via the double-bank control circuit (step S1140).

Electronic control device 2 receives the image data from cartridge 3 (step S1040) and performs processing that transfers this data to the laser engine 5 and prints it (step S1050). The previously made settings are used for the number of copies, etc. Transfer of the image data using the double-bank control circuit 624 and printing processing using the double-buffer circuit 520 in the laser printer 1 have already been explained in detail.

After CPU 510 performs the above processing, judgment is performed to determine if there is subsequent print data, i.e., whether print data has been sent from the workstation 7, and if there is subsequent print data, then processing returns to step S1020 above and is repeated. Microprocessor 601 in cartridge 3 also judges whether or not there is subsequent print data after the image data have been transferred by means of a notification from CPU 510 (step S1150, FIG. 29), and if there is subsequent print data, then the processing described above is repeated.

If there is no subsequent print data sent from the workstation 7, both CPU 510 in electronic control device 2 and microprocessor 601 in cartridge 3 escape to END and terminate the routine. In the above explanations, the transfer of print data and the developing of image data were performed in sequence for the sake of convenience, but in cases in which print data is transferred from the workstation 7 slowly, the receiving of print data and the developing of image data is generally performed in parallel using interrupt routines.

L. Effectiveness of First Embodiment

By means of the embodiment described above, large amounts of data can be efficiently transferred from the electronic device 2 to cartridge 3. Moreover, data can be transferred using a read-only data bus, thus making it possible to transfer data and perform various types of processing in printers 1 that were not designed to transfer data to the cartridge. Further, since the data transfer circuit is realized using an ASIC, the circuitry can be made compact and simplified. Also, since both the read control circuit 620 and the FIFO control circuit 623 are provided for the transfer of data from electronic control device 2 to the data transfer controller 603, one or the other may be used depending of the type of data to be transferred, thus facilitating efficient transfer of data. Also, should one or the other breakdown, the other can be used to compensate.

Since electronic control device 2 uses an interrupt to notify in the case of transfer of data to cartridge 3 in this embodiment, microprocessor 601 of cartridge 3 need not continually monitor the operation of electronic control device 2, thus allowing it to be operated more efficiently.

The embodiment explained above concerned the application of the invention to a printer, but application of the invention is not limited to printers; e.g., it can also be applied to word processors, personal computers and workstations. In recent years, in addition to expansion slots, many computer-related devices have the ability to accommodate cartridge-type expansion devices such as IC cards. By mounting the accessory control device of the invention in a word processor, personal computer, etc., equipped with an expansion slot, IC card, etc., a configuration is possible in which multiple bytes of data can be efficiently transferred from the main unit to the accessory control device.

The invention is not limited by the embodiments described above; e.g., a configuration in which the cartridge, with built-in outline fonts, receives the character point size and other data from the printer, generates a bit image at the specified point size and transfers it to the printer, a configuration in which the data received from the electronic device do not undergo particularly complex processing but rather are simply stored or displayed, a configuration in which the main printer unit is an ink jet printer, and other configurations are possible as long as they do not deviate from the essential points of the invention.

The invention can be applied to all types of devices that employ a processor, e.g., printers, electrical equipment for vehicles, facsimile machines, telephones, electronic pocketbooks, electronic musical instruments, electronic cameras, translating machines, handy copiers, cash dispensers, remote controllers, calculators and any other information processing device to which an accessory control device can be connected via a connector.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the subjoined claims.

What is claimed is:

1. An information processing device comprising:
   a) an electronic device comprising a first processor capable of logic operation, a first memory means for storing the programs executed by the processor and a connector connected to address signal and data signal lines of the first processor; and
   b) an accessory control device connected to the connector; wherein
      the electronic device further comprises a multiple data output means that sequentially outputs multiple data to be transferred to the accessory control device;
      the accessory control device comprises a memory means for storing the written data in a prescribed order; and a data write means that writes the multiple data output from the electronic device to the memory means for transfer;
      said multiple data output means of said electronic device is a transfer data output means that transfers the data to be output exclusively as part of an address signal and outputs the address signal via the address signal line of the connector; and
      the accessory control device further comprises a data hold means that fetches and holds the data reflected in the address signal output from the electronic device, and a write drive means that operates the data write means at a prescribed timing when data is being held in the data-hold means.

2. The information processing device claim 1 wherein said accessory control device further comprises a second processor that executes processing separate from said first processor and a second memory means that stores routines executed by said second processor.

3. The information processing device of claim 1 wherein the memory means is a first-in first-out semiconductor memory.

4. The information processing device of claim 1 wherein
   the transfer data output means of the electronic device is equipped with a signal conversion means that reflects the data to be transferred in the address signal; and
   the data-hold means of the accessory control device is equipped with
   fetch means that reads the address signal output by the transfer data output means, data restoration means that restores the data from the address signal, and hold means that holds the restored data.

5. The information processing device of claim 1 wherein the accessory control device is equipped with a third memory means that stores the routine which is executed by the first processor in the electronic device and is equivalent to the multiple data output means of the electronic device.

6. The information processing device of claim 2 wherein the accessory control device is configured as a cartridge equipped with a printed circuit board on which is mounted at least the second processor and having a case for housing the printed circuit board to facilitate its use as a single unit.

7. The information processing device of claim 6 wherein the second processor is positioned for effective radiation of heat while the accessory control device is mounted in the electronic device.

8. The information processing device of claim 1 wherein the accessory control device processes the data fetched by the data fetch means and is equipped with a means that outputs the data after being processed to the electronic device.

9. An accessory control device that is connected via a connector having address signal and data signal lines to an electronic device equipped with a first processor capable of logic operation and a first memory means that stores the processing executed by the processor, wherein the accessory control device includes:

a memory means that stores data transferred from the electronic device in a prescribed order, and data write means that writes data transferred from the electronic device in the memory means, wherein the electronic device transfers data to the accessory control device exclusively as part of an address signal via the address signal line of the connector, and the accessory control device further includes:

a data hold means that fetches and holds the data from the address signal, and write drive means that operates the data write means at a prescribed timing when data is being held in the data hold means.

10. The accessory control device of claim 9 wherein the accessory control device is equipped with a second processor that executes processing separate from the first processor of the electronic device and a second memory means that stores routines executed by the second processor, and that the second processor reads out data from the memory means for transfer and also processes at least part of the data read out.

11. The accessory control device of claim 10 wherein the memory means for transfer is a first-in first-out semiconductor memory.

12. The accessory control device of claim 9 wherein the data hold means is equipped with fetch means that reads the address signal, and data restoration means that restores the data from the address signal.

13. The accessory control device of claim 9 wherein the accessory control device is equipped with a third memory means which stores the routine executed by the first processor in the electronic device and which is the routine that outputs the address signal in at least part of which the data to be transferred have been reflected.

14. The accessory control device of claim 10 wherein the accessory control device is configured as a cartridge equipped with a printed circuit board on which is mounted at least the second processor and having a case for housing the printed circuit board to facilitate its use as a single unit.

15. The accessory control device of claim 14 wherein the second processor is positioned for effective radiation of heat while the accessory control device is mounted in the electronic device.

16. The accessory control device of claim 9 wherein the accessory control device processes the data transferred to the memory means for transfer and is equipped with a means that outputs the data after being processed to the electronic device.

17. The information processing device of claim 1 wherein the electronic device further comprises a display means for displaying at least characters, graphics or color, and the accessory control device is equipped with an image data generation means that generates image data displayed on the above device based on data transferred from the electronic device.

18. The information processing device of claim 17 wherein the electronic device is a printer that receives print data and prints it.

19. The accessory control device of claim 9 wherein the accessory control device further comprises an image data developing means that develops image data based on data received from the electronic device.

20. An electronic device, comprising:

a processor;

a bi-directional address bus in communication with said processor for transferring address data;

an interface connector in communication with said address bus for removably receiving and electrically connecting an accessory control device;

a unidirectional, read-only data bus in communication with said processor and said accessory control device via said interface connector for transferring peripheral device data from the accessory control device to said processor; and a data driver in communication with said processor and said address bus for encoding electronic device data in an address data format, latching the encoded electronic device data onto said address bus, and transmitting the latched, encoded electronic device data to the accessory control device according to a predetermined address timing sequence.

21. The electronic device of claim 20, wherein the accessory control device comprises a data hold circuit in communication with said address bus for decoding the encoded electronic device data transmitted by said data driver according to the predetermined address timing sequence and latching the decoded electronic device data for accessory control device use.

22. The electronic device of claim 21, wherein the accessory control device further comprises:

a memory; and a data write circuit in communication with the data hold circuit and the memory for transferring the decoded electronic device data held by the data hold to the memory according to a prescribed order and transfer timing sequence.

* * * * *